United States Patent
Szuromi et al.

(10) Patent No.: US 11,066,488 B2
(45) Date of Patent: Jul. 20, 2021

(54) BIARYL PHENOXY GROUP IV TRANSITION METAL CATALYSTS FOR OLEFIN POLYMERIZATION

(71) Applicant: Dow Global Technologies LLC, Midland, MI (US)

(72) Inventors: Endre Szuromi, Lake Jackson, TX (US); David D. Devore, Midland, MI (US); Robert D. J. Froese, Midland, MI (US); Arkady L. Krasovskiy, Lake Jackson, TX (US); Lixin Sun, Lake Jackson, TX (US); Kevin A. Frazier, Midland, MI (US); Joseph S. Renny, London (GB)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/620,306

(22) PCT Filed: Jun. 18, 2018

(86) PCT No.: PCT/US2018/038050
§ 371 (c)(1),
(2) Date: Dec. 6, 2019

(87) PCT Pub. No.: WO2018/236738
PCT Pub. Date: Dec. 27, 2018

(65) Prior Publication Data
US 2020/0190228 A1 Jun. 18, 2020

Related U.S. Application Data

(60) Provisional application No. 62/522,200, filed on Jun. 20, 2017.

(51) Int. Cl.
| | | |
|---|---|---|
| *C08F 4/64* | (2006.01) | |
| *C08F 110/02* | (2006.01) | |
| *C08F 210/16* | (2006.01) | |
| *C08F 4/659* | (2006.01) | |

(52) U.S. Cl.
CPC ...... *C08F 4/64193* (2013.01); *C08F 4/65908* (2013.01); *C08F 4/65912* (2013.01); *C08F 110/02* (2013.01); *C08F 210/16* (2013.01)

(58) Field of Classification Search
CPC ........... C08F 4/64193; C08F 110/02; C08F 4/65912; C08F 4/65908; C08F 210/16
See application file for complete search history.

(56) References Cited

U.S. PATENT DOCUMENTS

2006/0052554 A1   3/2006   Boussie et al.

FOREIGN PATENT DOCUMENTS

| WO | 03091262 A1 | 11/2003 |
|---|---|---|
| WO | 2007076231 A2 | 7/2007 |
| WO | 2013013111 A1 | 1/2013 |
| WO | 2013036546 A2 | 3/2013 |
| WO | 2013052585 A2 | 4/2013 |

OTHER PUBLICATIONS

International Search Report and Written Opinion pertaining to PCT/US2018/038050, dated Sep. 27, 2018.

*Primary Examiner* — Catherine S Branch
(74) *Attorney, Agent, or Firm* — Dinsmore & Shohl LLP

(57) ABSTRACT

Embodiments are directed to a catalyst system comprising metal-ligand complexes and processes for polyolefin polymerization using the metal-ligand complex having the following structure:

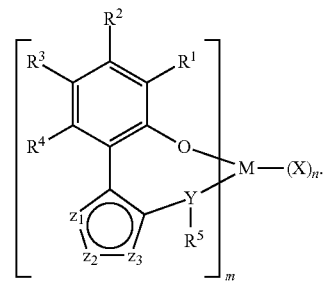

20 Claims, No Drawings

BIARYL PHENOXY GROUP IV TRANSITION METAL CATALYSTS FOR OLEFIN POLYMERIZATION

CROSS REFERENCE TO RELATED APPLICATION

This application is a National Stage Entry under 35 U.S.C. § 371 of International Patent Application No. PCT/US2018/038050, filed Jun. 18, 2018, which claims the benefit of U.S. Provisional Patent Application Ser. No. 62/522,200, filed Jun. 20, 2017, which are hereby incorporated by reference in their entirety.

TECHNICAL FIELD

Embodiments of the present disclosure generally relate to olefin polymerization catalyst systems and processes, and, more specifically, the synthesis of biaryl phenoxy group IV transition metal catalysts for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, or a molecular (either metallocene or non-metallocene catalyst system. The reactants in the diluent and the catalyst system are circulated at an elevated polymerization temperature around the reactor thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor, e.g. reactor, serially connected to the first reactor where a second polyethylene fraction may be produced.

Despite the research efforts in developing catalyst systems suitable for olefin polymerization, such as polyethylene or polypropylene polymerization, there is still a need for a pro-catalyst and a catalyst system exhibiting a higher efficiency than comparative catalyst systems, which are capable of producing polymer with high molecular weights and a narrow molecular weight distribution.

SUMMARY

According to some embodiments, a catalyst system includes a metal-ligand complex according to formula (I):

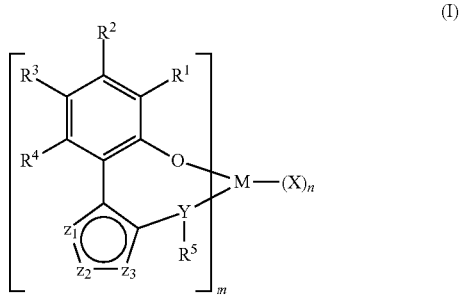

In formula (I), M is a metal chosen from titanium, zirconium, or hafnium, the metal having a formal oxidation state of +2, +3, or +4. Each X is a monodentate or bidentate ligand independently chosen from $(C_1\text{-}C_{50})$hydrocarbon, $(C_1\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, $-N(R^N)_2$, and $-NCOR^C$. Subscript n is 1, 2 or 3. Subscript m is 1 or 2. The metal-ligand complex has 6 or fewer metal-ligand bonds and is overall charge-neutral.

In embodiments of formula (I), each Y is independently selected from oxygen or sulfur. Each $R^1$, $R^2$, $R^3$, and $R^4$ is independently selected from the group consisting of $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, and $-H$. Each $R^5$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, $-Si(R^C)_3$, and $-Ge(R^C)_3$, and, when m is 2, two $R^5$ are optionally covalently linked.

In embodiments of formula (I), for each individual ring containing groups $z_1$, $z_2$, and $z_3$, each of $z_1$, $z_2$, and $z_3$ is independently selected from the group consisting of sulfur, oxygen, $-N(R^R)-$, or $-C(R^R)-$ and at least one and not more than two of $z_1$, $z_2$, and $z_3$ are $-C(R^R)-$, where $R^R$ is $-H$ or $(C_1\text{-}C_{30})$hydrocarbyl, wherein any two $R^R$ groups bonded to neighboring atoms are optionally linked. In formula (I), each $R^C$, $R^N$, and $R^P$ in formula (I) is independently a $(C_1\text{-}C_{30})$hydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpent-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; t-BuLi: tert-butyllithium; $Cs_2CO_3$: cesium carbonate; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $N_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min minutes; h: hours; d: days.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc. A chemical name attached to an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term persubstitution means that every hydrogen atom (H) bonded to a carbon atom or heteroatom of a corresponding unsubstituted compound functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic system has one ring, which is aromatic; a bicyclic aromatic hydrocarbon radical has two rings; and a tricyclic aromatic hydrocarbon radical has three rings. When the bicyclic or tricyclyc aromatic hydrocarbon radical is present, at least one of the rings in the radical is aromatic. The multi-ring radicals are independently fused or non-fused. Examples of unsubstituted. $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{10})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —$CH_2$—) or on adjacent carbon atoms 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$—, in which "$C^*$" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$CO$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo[2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted $(C_1-C_{18})$hydrocarbyl and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si(R$^C$)$_2$—, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include Si(R$^C$)$_3$, Ge(R$^C$)$_3$, Si(R$^C$)$_2$, Ge(R$^C$)$_2$, P(R$^P$)$_2$, P(R$^P$), N(R$^N$)$_2$, N(R$^N$), N, O, OR$^C$, S, SR$^C$, S(O), and S(O)$_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyi, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including any such double bonds that may be present in substituents $R^S$, if any, or in (hetero) aromatic rings, if any.

Embodiments of this disclosure include catalyst systems that include a metal-ligand complex according to formula (I):

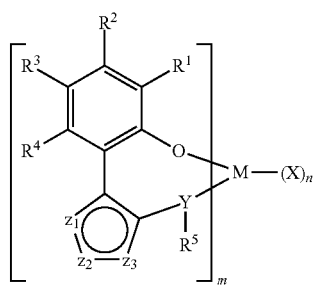

(I)

In formula (I), M is a metal chosen from titanium, zirconium, or hafnium, the metal having a formal oxidation state of +2, +3, or +4; each X is a monodentate or bidentate ligand independently selected from the group consisting of $(C_1-C_{50})$hydrocarbyl, $(C_6-C_{20})$aryl, $(C_6-C_{20})$heteroaryl, cyclopentadienyl, substituted cyclopentadienyl, $(C_4-C_{12})$diene, halogen, and amide. The subscript n of (X), referring to a number of ligands X bonded to or associated with the metal M, is an integer is 1, 2, or 3. The subscript m is 1 or 2; the metal ligand complex has 6 or fewer metal-ligand bonds and can be overall charge-neutral or may have a positive-charge associated with the metal center. Each Y is independently selected from oxygen or sulfur.

In embodiments, the catalyst system may include a metal-ligand complex according to formula (I), in which each $R^1$, $R^2$, $R^3$, and $R^4$ is independently selected from the group consisting of $(C_1-C_{50})$hydrocarbyl, $(C_1-C_{50})$heterohydrocarbyl, $(C_1-C_{50})$aryl, $(C_1-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, and $-H$; and in which each $R^5$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, and $-Ge(R^C)_3$. Each $R^C$, $R^N$, and $R^P$ in formula (I) is independently a $(C_1-C_{30})$hydrocarbyl.

In some embodiments, any or all of the chemical groups (e.g., X, Y, $R^{1-5}$, Y, and $z_{1-3}$) of the metal-ligand complex of formula (i) may be unsubstituted. In other embodiments, none, any, or all of the chemical groups X, $R^{1-5}$, Y, and $z_{1-3}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^{1-5}$, Y, and $z_{1-3}$ may be persubstituted with $R^S$. In the chemical groups that are persubstituted with $R^S$, the individual $R^S$ may all be the same or may be independently chosen.

In some embodiments, the catalyst system includes a metal-ligand complexes according to formula (I), in which M is zirconium or hafnium; each X is independently chosen from $(C_6-C_{20})$aryl, $(C_6-C_{20})$heteroaryl, $(C_4-C_{12})$diene, or a halogen; each Y is oxygen; each $R^1$ is independently chosen from $(C_1-C_{50})$aryl, $(C_1-C_{50})$heteroaryl; and each $R^2$, $R^3$ and $R^4$ is independently chosen from $(C_1-C_{50})$hydrocarbyl, $(C_1-C_{50})$heterohydrocarbyl, $(C_1-C_{50})$aryl, $(C_1-C_{50})$heteroaryl, halogen, and $-H$.

In some catalyst systems of this disclosure, the catalyst system may include a metal-ligand complex according to formula (I), in which each individual ring containing groups $z_1$, $z_2$, and $z_3$, each of $z_1$, $z_2$, and $z_3$ is independently selected from the group consisting of sulfur, oxygen, $-N(R^R)-$, or $-C(R^R)-$, and at least one and not more than two of $z_1$, $z_2$, and $z_3$ are $-C(R^R)-$, where $R^R$ is $-H$ or $(C_1-C_{30})$hydrocarbyl. Any two $R^R$ groups bonded to neighboring atoms are optionally linked. In some embodiment, for each individual ring containing groups $z_1$, $z_2$, and $z_3$, one of $z_1$, $z_2$, and $z_3$ is a sulfur atom, and two of $z_1$, $z_2$, and $z_3$ are $-C(H)-$.

In some embodiments, each $R^1$ may be chosen from carbazol, carbazol-9-yl substituted with $R^S$ or more than one $R^S$, phenyl, phenyl substituted with $R^S$ or more than one $R^S$, anthracenyl, or anthracene-9-yl substituted with $R^S$ or more than one $R^S$, in which $R^S$ may be a $(C_1-C_{30})$hydrocarbyl. In other embodiment, each $R^1$ may be chosen from carbazol-9-yl, 3,6-di-tert-butylcarbazol-9-yl, 2,7-di-tert-butylcarbazol-9-yl, anthracene-9-yl, 3,5-di-tert-butylphenyl, 1,1':3',1''-terphenyl-5'-yl, 3,3'',5,5''-tetra-tert-butyl-1,1':3',1''-terphenyl-5'-yl.

In one or more embodiments, each $R^2$ is chosen from methyl, ethyl, propyl, 2-propyl, 2-methylpropyl, n-butyl, tert-butyl (also called 1,1-dimethylethyl), pentyl, hexyl, heptyl, tert-octyl (also called 1,1,3,3-tetramethylbutyl), n-octyl, nonyl, chlorine, fluorine, or $-H$.

In some embodiments, each $R^3$ is chosen from methyl ethyl, propyl, 2-propyl, 2-methylpropyl, n-butyl, tert-butyl, pentyl, hexyl, heptyl, tert-octyl, n-octyl, nonyl, chlorine, fluorine, or $-H$.

In one or more embodiments, $R^1$ may be 3,6-di-tert-butylcarbazol-9-yl, $R^2$ may be tert-octyl, and $R^3$ and $R^4$ may be $-H$. In some embodiments, $R^1$ may be carbazolyl, $R^2$ may be methyl, and $R^3$ and $R^4$ may be $-H$. In other embodiments, $R^1$ may be 3,5-di-tert-butylphenyl, $R^2$ may be methyl, and $R^3$ and $R^4$ may be $-H$.

In one or more embodiments, the catalyst system includes a metal-ligand complex according to formula (I), in which each Y independently is O, S, $N(C_1-C_{50})$hydrocarbyl, or $P(C_1-C_{50})$hydrocarbyl. In some embodiments, when m is 2, each Y is different and may be selected from O and $N(C_1-C_{50})$hydrocarbyl, (for example, $NCH_3$). In other embodiments, when m is 2, each Y may be independently selected from O and S or independently selected from S and N($C_1$-$C_{50}$)hydrocarbyl. In further embodiments, when m is 2, each Y may be the same and selected from O and S.

According to another embodiment of this disclosure, catalyst systems include the metal-ligand complex of formula (I), wherein m is 2 and the metal-ligand complex has a structure according to formula (II):

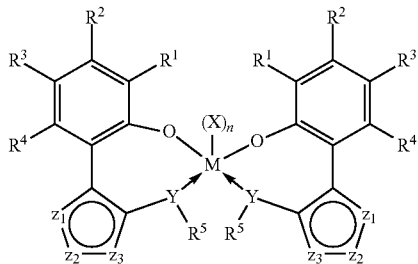

(II)

In formula (II), $R^1$, $R^2$, $R^3$, $R^4$, $R^5$, $z_1$, $z_2$, $z_3$, Y, and X are as defined in formula (I); and n may be 1 or 2. It should be readily understood that all metal-ligand complexes according to formula (II) are also complexes according to formula (I). Therefore, embodiments described with respect to metal-ligand complexes according to formula (II) necessarily apply to complexes according to formula (I).

In embodiments, when m is 2 each individual ring containing groups $z_1$, $z_2$, and $z_3$, one of $z_1$, $z_2$, and $z_3$ is sulfur, oxygen, —N($R^R$)—, or —C($R^R$)—, where $R^R$ is —H or ($C_1$-$C_{30}$)hydrocarbyl, wherein any two $R^R$ groups bonded to neighboring atoms are optionally linked. In other embodiments, the catalyst system may include a metal-ligand complex according to formula (II), in which for each individual ring containing groups $z_1$, $z_2$, and $z_3$, one of $z_1$, $z_2$, and $z_3$ is a sulfur atom, and two of $z_1$, $z_2$, and $z_3$ are —C(H)—.

In one or more embodiments, the catalyst system may include a metal-ligand complex according to formula (II), in which M is zirconium or hafnium; each X is independently chosen from ($C_1$-$C_{50}$)hydrocarbyl, ($C_6$-$C_{20}$)aryl, ($C_6$-$C_{20}$)heteroaryl, ($C_4$-$C_{12}$)diene (such as buta-1,3-diene), or halogen; each Y is oxygen; each $R^1$ is independently chosen from ($C_1$-$C_{50}$)aryl or ($C_1$-$C_{40}$)heteroaryl; and each $R^2$, $R^3$, and $R^4$ is independently chosen from ($C_1$-$C_{50}$)hydrocarbyl, ($C_1$-$C_{50}$)heterohydrocarbyl, ($C_1$-$C_{50}$)aryl, ($C_1$-$C_{50}$)heteroaryl, halogen, and hydrogen.

In some embodiments, each X is a benzyl, and each $R^2$ is methyl. In further embodiments, each X is a benzyl, each $R^2$ is methyl, and each $R^1$ may be 3,6-di-tert-butylcarbazol-9-yl, 2,7-di-tert-butylcarbazol-9-yl, caboxzoyl, or 3,5-di-tert-butylphenyl. In some embodiments, each X is a benzyl, each $R^2$ is methyl, and each $R^3$ may be tert-octyl or methyl.

The catalyst system according to different embodiments of formula (II) can further include a divalent radical Q consisting of two covalently linked groups $R^5$, whereby the metal-ligand complex has a structure according to formula (III):

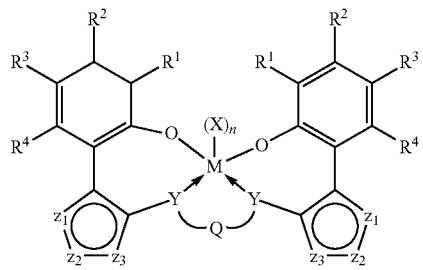

(III)

In formula (III), $R^{1-4}$, $z_1$, $z_2$, and $z_3$, Y, M, X, and n are as defined in formula (II). The term "covalently linked" in reference to both $R^5$ means that the two $R^5$ groups of the metal-ligand complex of formula (II) are joined through at least one covalent bond so as to form a single diradical unit represented by Q in formula (III).

Thus, in formula (III), Q represents the two $R^5$ groups of formula (II) as a single ($C_1$-$C_{12}$)alkylene, ($C_1$-$C_{12}$)heteroalkylene, or ($C_6$-$C_{18}$)arylene. When Q is a diradical unit such as ($C_1$-$C_{12}$)alkylene or ($C_1$-$C_{12}$)heteroalkylene, the two radical bearing atoms of the diradical unit are separated by one or more than intervening carbon atoms such that both Y atoms of formula (III) are linked through a group having three to twelve atoms, wherein at least two of the three to twelve atoms are carbon atoms, and not more than two of the three to twelve atoms are heteroatoms. In some embodiments, Q is chosen from ($C_6$-$C_{18}$)arylene 1,4-diradicals, ($C_6$-$C_{18}$)arylene 1,5-diradicals, and ($C_6$-$C_{18}$)arylene 1,6-diradicals; ($C_4$-$C_{20}$)cycloalkylene 1,4-diradicals, ($C_4$-$C_{20}$)cycloalkylene 1,5-diradicals, or ($C_4$-$C_{20}$)cycloalkylene 1,6-diradicals; ($C_3$-$C_{20}$)alkylene 1,4-diradicals, ($C_3$-$C_{20}$)alkylene 1,5-diradicals, or ($C_3$-$C_{20}$)alkylene 1,6-diradicals; hepta-2,6-diyl (e.g., $CH_3C^*(H)CH_2CH_2CH_2C^*(H)CH_3$); 2,6-dimethylhepta-2,6-diyl; 3,3-dimethylpenta-1,5-diyl; and ortho-xylylene. In other embodiments, when Q is a ($C_1$-$C_{12}$) heteroalkylene, Q is chosen from (—$CH_2CH_2Si(Me)_2$ $CH_2CH_2$—); (—$CH_2CH_2Si(^iPr)_2CH_2CH_2$—); (—$CH_2$ $CH_2Si(n\text{-}octyl)_2CH_2CH_2$—); (—$CH_2CH_2Ge(Me)_2CH_2$ $CH_2$—); (—$CH_2CH_2Ge(^iPr)_2CH_2CH_2$—); and (—$CH_2$ $CH_2Ge(n\text{-}octyl)_2CH_2CH_2$—).

Embodiments of formula (I) include embodiments of formula (II). Similarly, embodiments of formula (I) and formula (II) include embodiments of formula (III). Capable The M in the metal-ligand complex of formulas (I), (II) or (III) may be a transition metal such as titanium (Ti), zirconium (Zr), or hafnium (Hf), the transition metal may have a formal oxidation state of +2, +3, or +4. The subscript n of $(X)_n$, referring to a number of ligands X bonded to or associated with the metal M, of formula (I) is 1, 2, or 3.

The metal M in the metal-ligand complex of formulas (I), (II) or (III) may be derived from a metal precursor that is subsequently subjected to a single-step or multi-step synthesis to prepare the metal-ligand complex. Suitable metal precursors may be monomeric (one metal center) or dimeric (two metal centers), or may have a plurality of metal centers greater than two, such as 3, 4, 5, or more than 5 metal centers. Specific examples of suitable hafnium and zirconium precursors include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, Zr(CH₂Ph)₃Cl, Zr(CH₂CMe₃)₃Cl, Zr(CH₂SiMe₃)₃Cl, Zr(CH₂Ph)₂Cl₂, Zr(CH₂CMe₃)₂Cl₂, Zr(CH₂SiMe₃)₂Cl₂, Zr(NMe₂)₄, Zr(NEt₂)₄, Zr(NMe₂)₂Cl₂, Zr(NEt₂)₂Cl₂, Zr(N(SiMe₃)₂)₂Cl₂, TiBn₄, TiCl₄ and Ti(CH₂Ph)₄. Lewis base adducts of these examples are also suitable as metal precursors, for example, ethers, amines, thioethers, and phosphines are suitable as Lewis bases. Specific examples include HfCl₄(THF)₂, HfCl₄(SMe₂)₂ and Hf(CH₂Ph)₂Cl₂(OEt₂). Activated metal precursors may be ionic or zwitterionic compounds, such as (M(CH₂Ph)₃⁺)(B(C₆F₅)₄⁻) or (M(CH₂Ph)₃⁺) (PhCH₂B(C₆F₅)₃⁻) where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral when in a procatalyst form. In some embodiments, the monodentate ligand may be a monoanionic ligand.

Monoanionic ligands have a net formal oxidation state of −1. Each monoanionic ligand may independently be hydride, (C₁-C₄₀)hydrocarbyl carbanion, (C₁-C₄₀)heterohydrocarbyl carbanion, halide, nitrate, carbonate, phosphate, sulfate, HC(O)O⁻, HC(O)N(H)⁻, (C₁-C₄₀)hydrocarbylC(O)O⁻, (C₁-C₄₀)hydrocarbylC(O)N((C₁-C₂₀)hydrocarbyl)⁻, (C₁-C₄₀)hydrocarbylC(O)N(H)⁻, R$^K$R$^L$B⁻, R$^K$R$^L$N⁻, R$^K$O⁻, R$^K$S⁻, R$^K$R$^L$P⁻, or R$^M$R$^K$R$^L$Si⁻, where each R$^K$, R$^L$, and R$^M$ is independently hydrogen, (C₁-C₄₀)hydrocarbyl, or (C₁-C₄₀)heterohydrocarbyl, or R$^K$ and R$^L$ are taken together to form (C₁-C₄₀)hydrocarbylene or (C₁-C₂₀)heterohydrocarbylene and R$^M$ is as defined above.

In other embodiments, at least one monodentate ligand X, independently from any other ligands X, may be a neutral ligand. In specific embodiments, the neutral ligand is a neutral Lewis base group such as R$^X$NR$^K$R$^L$, R$^K$OR$^L$, R$^K$SR$^L$, or R$^X$PR$^K$R$^L$, where each R$^X$ independently is hydrogen, [(C₁-C₁₀)hydrocarbyl]₃Si(C₁-C₁₀)hydrocarbyl, (C₁-C₁₀)hydrocarbyl, [(C₁-C₁₀)hydrocarbyl]₃Si, or (C₁-C₄₀)heterohydrocarbyl and each R$^K$ and R$^L$ independently is as defined above.

Additionally, each X can be a monodentate ligand that, independently from any other ligands X, is a halogen, unsubstituted (C₁-C₂₀)hydrocarbyl, unsubstituted (C₁-C₂₀)hydrocarbylC(O)O—, or R$^K$R$^L$N—, wherein each of R$^K$ and R$^L$ independently is an unsubstituted(C₁-C₂₀)hydrocarbyl. In some embodiments, each monodentate ligand X of the metal-ligand complex is a chlorine atom, (C₁-C₁₀)hydrocarbyl (e.g., (C₁-C₆)alkyl or benzyl), unsubstituted (C₁-C₁₀)hydrocarbylC(O)O—, or R$^K$R$^L$N—, wherein each of R$^K$ and R$^L$ independently is an unsubstituted (C₁-C₁₀)hydrocarbyl.

In some embodiments, the catalyst system may include at least one metal-ligand complex according to either formula (I) or (II), in which n is 2 or greater than 2, such that there are at least two groups X, and in which any two groups X may be joined to form a bidentate ligand. In illustrative embodiments including a bidentate ligand, the bidentate ligand may be a neutral bidentate ligand. In one embodiment, the neutral bidentate ligand is a diene of formula (R$^D$)₂C═C(R$^D$)—C(R$^D$)═C(R$^D$)₂, wherein each R$^D$ independently is H, unsubstituted (C₁-C₆)alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., ⁻O₂CC(O)O⁻), (C₂-C₄₀)hydrocarbylene dicarbanion, (C₁-C₄₀)heterohydrocarbylene dicarbanion, phosphate, or sulfate.

In further embodiments. X is selected from methyl; ethyl; 1-propyl; 2-propyl; 1-butyl; 2,2,-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In some embodiments, n is 2 and the two X groups join to form a bidentate ligand. In other embodiments, the bidentate ligand is 2,2-dimethyl-2-silapropane-1,3-diyl or 1,3-butadiene.

In illustrative embodiments, the catalyst systems may inlcude a metal-ligand complex according to any of formulas (I), (II), or (III) having the structure of any of Procatalysts 1-32:

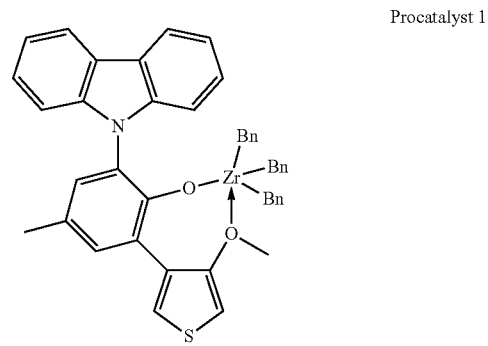

Procatalyst 1

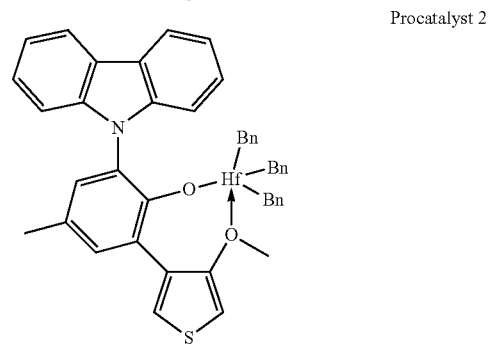

Procatalyst 2

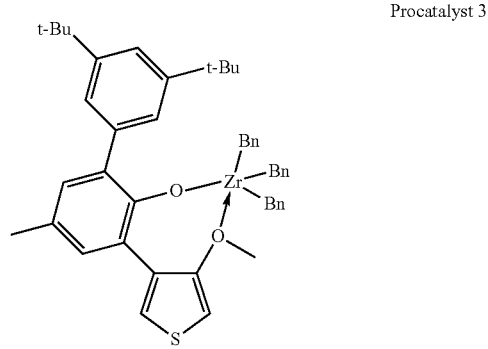

Procatalyst 3

Procatalyst 4
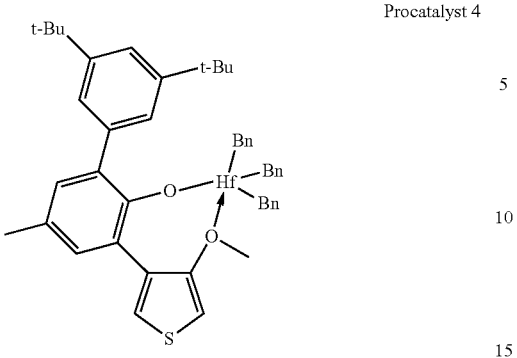
Procatalyst 5
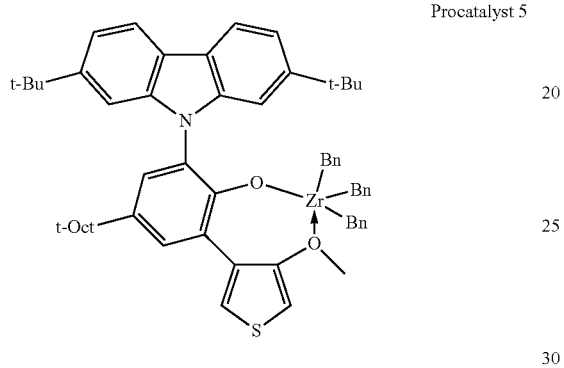
Procatalyst 6
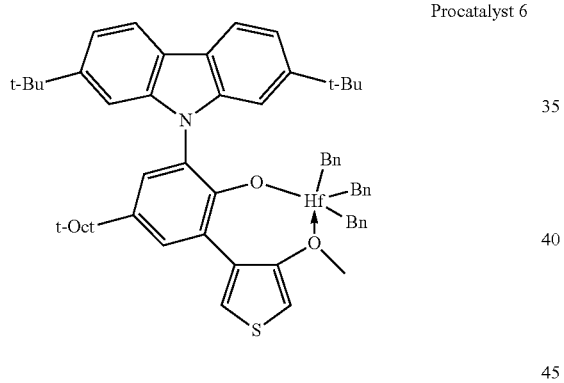
Procatalyst 7
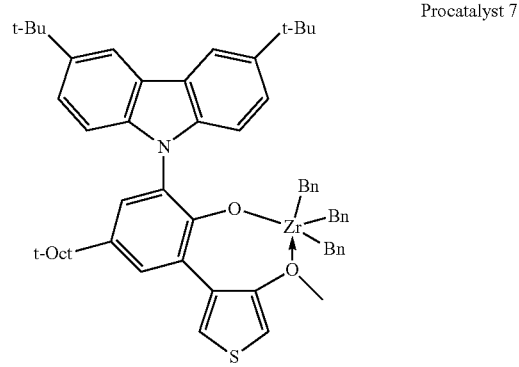
Procatalyst 8
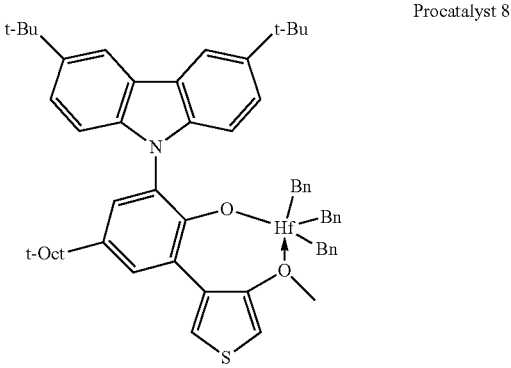
Procatalyst 9
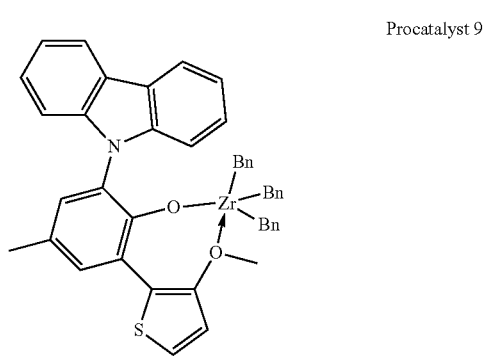
Procatalyst 10
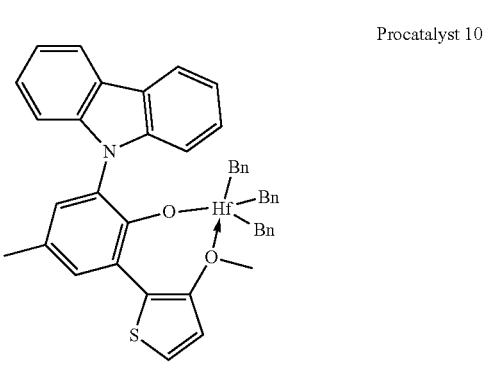
Procatalyst 11
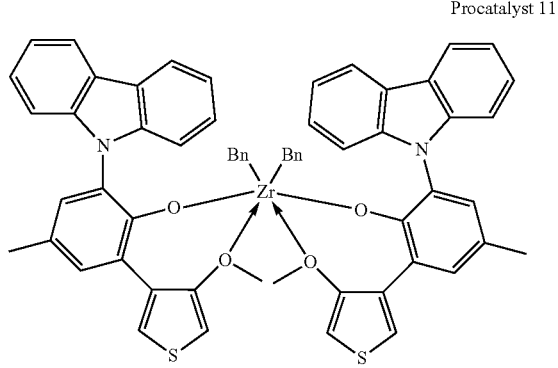

-continued
Procatalyst 12
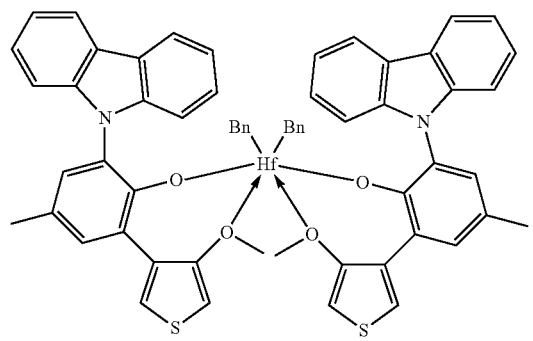
Procatalyst 13
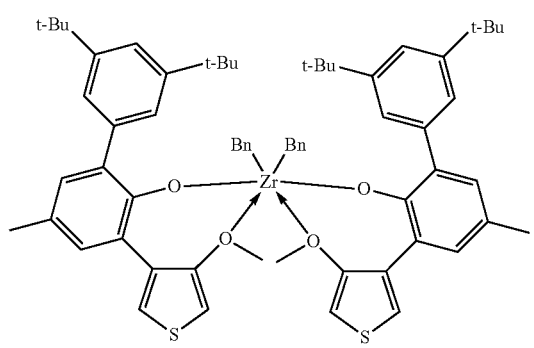
Procatalyst 14
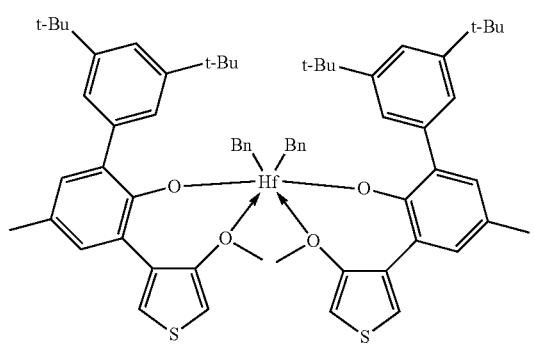
Procatalyst 15
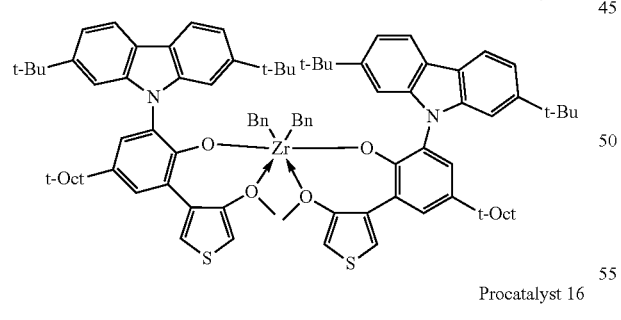
Procatalyst 16
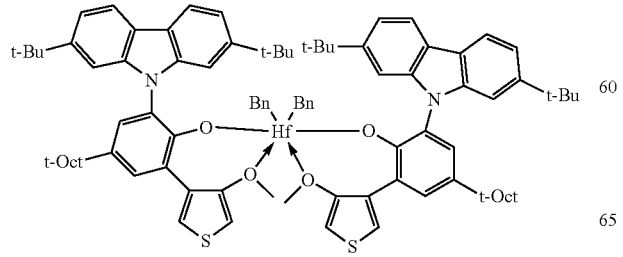
-continued
Procatalyst 17
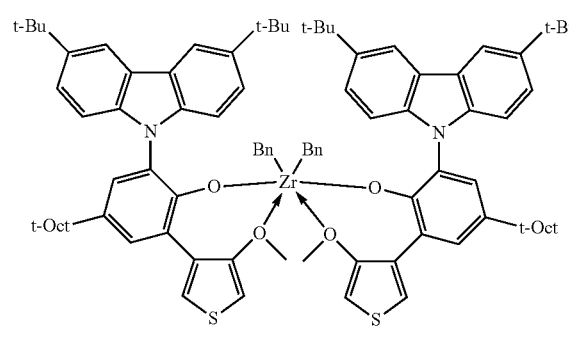
Procatalyst 18
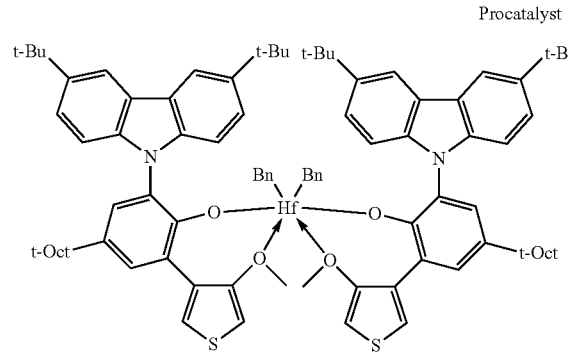
Procatalyst 19
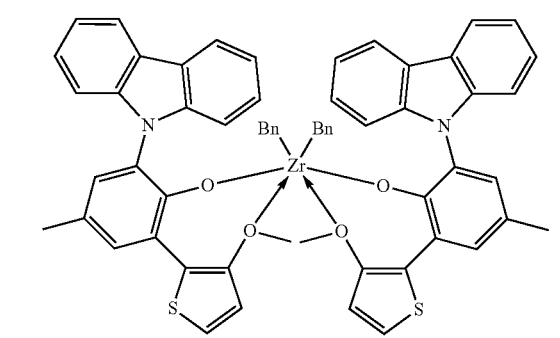
Procatalyst 20

Procatalyst 21
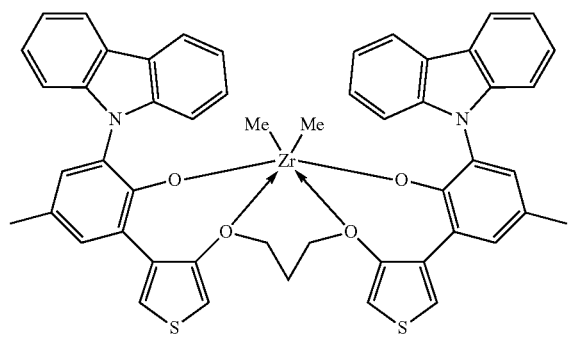
Procatalyst 25
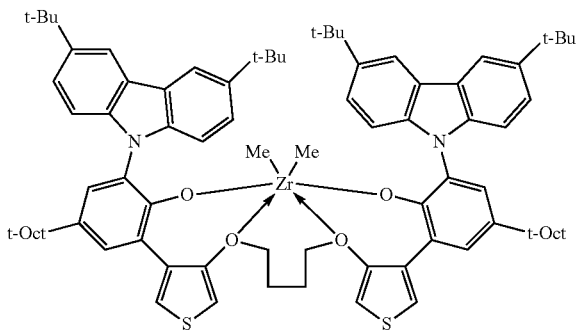
Procatalyst 22
Procatalyst 26
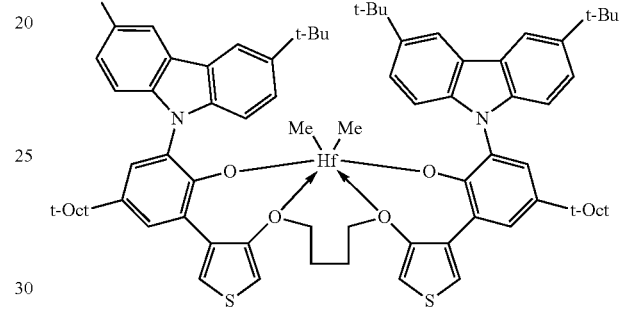
Procatalyst 23
Procatalyst 27
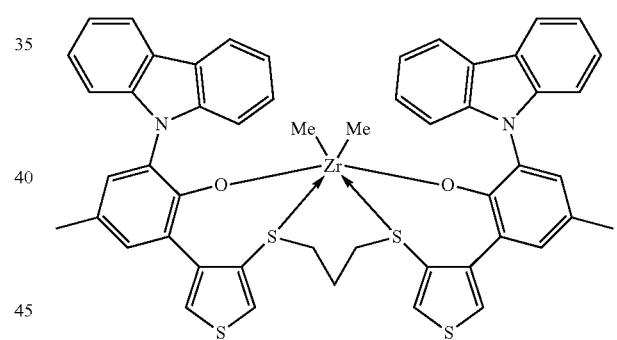
Procatalyst 24
Procatalyst 28
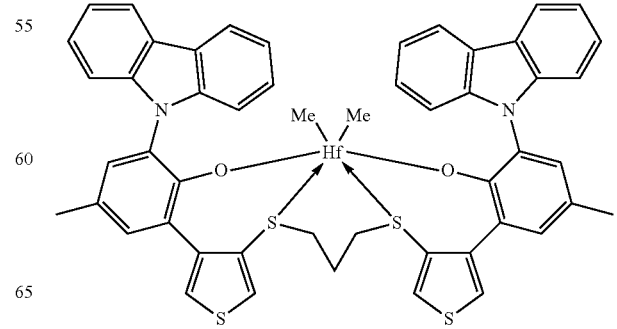

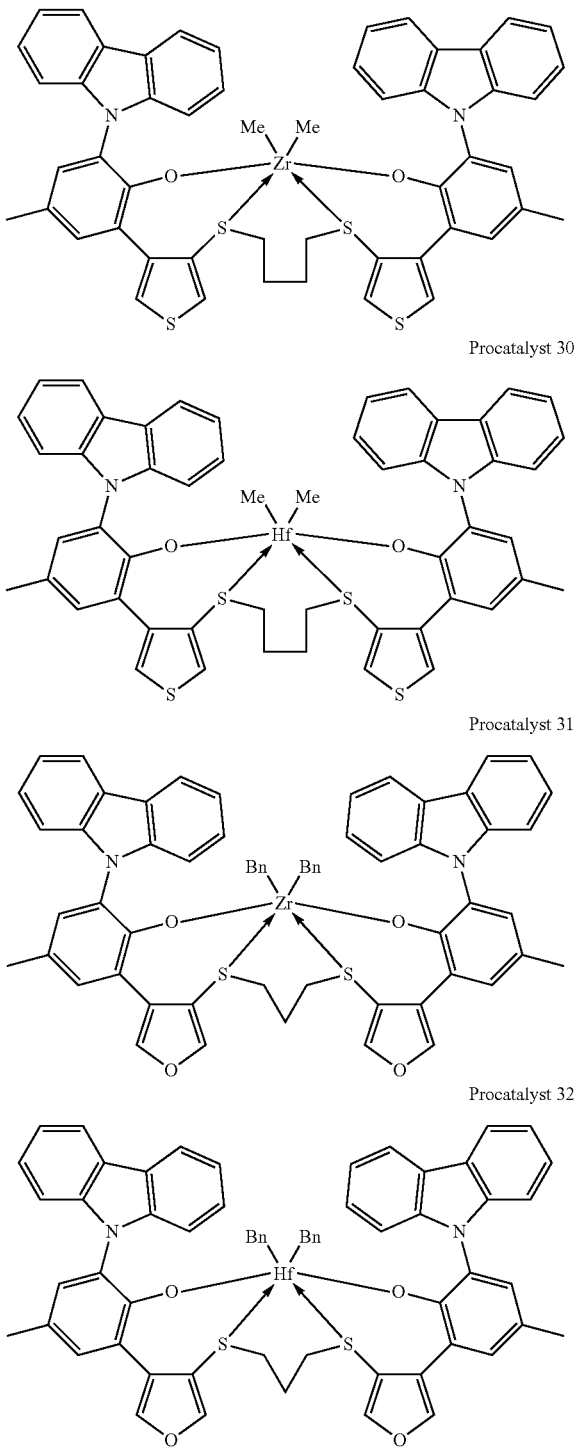

Procatalyst 29

Procatalyst 30

Procatalyst 31

Procatalyst 32

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which is positively charged. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or olimneric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{10}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentailuorophenyl)boran. As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri(($C_1$-$C_4$)alkyl)aluminum and a halogenated tri(($C_6$-$C_{18}$)aryl) boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. An specific example of a co-catalyst combination is a mixture of a tri(($C_1$-$C_4$)hydrocarbyl)aluminum, tri(($C_1$-

C₄)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(PH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal ligand complex of formulas (I), (II), and (III). The polymer resulting from such a catalyst system that incorporates the metal-ligand complex of formula (I), may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formulas (I), (II) and (III) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formulas (I), (II) and (III) has a molecular-weight distribution (MWD) from 1 to 10, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

General Procedure for Batch Reactor Polymerization

Raw materials (ethylene, 1-octene) and the process solvent (a narrow boiling range high-purity isoparaffinic solvent trademarked ISOPAR E commercially available from ExxonMobil Corporation) are purified with molecular sieves before introduction into the reaction environment. A one gallon (3.79 L) stirred autoclave reactor is charged with ISOPAR E, and 1-octene. The reactor is then heated to the reaction temperature and ethylene is added bringing the total pressure to ca 320 psig. The catalyst composition is prepared in a drybox under inert atmosphere by mixing the desired metal-ligand complex and a co-catalyst ([HNMe(C$_{18}$H$_{37}$)$_2$][B(C$_6$F$_5$)$_4$] along with modified methylaluminoxane (MMAO), with additional solvent to give a total volume of about 15 to about 20 mL. The activated catalyst mixture is quick-injected into the reactor. The reactor pressure and temperature are kept constant by feeding ethylene during the polymerization and cooling the reactor as needed. After 10 minutes, the ethylene feed is shut off, and the solution transferred into a nitrogen-purged resin kettle. The polymer is thoroughly dried in a vacuum oven, and the reactor is rinsed with hot ISOPAR E between polymerization runs.

General Procedure for PPR Screening Experiments

Polyolefin catalysis screening is performed in a Freeslate (formerly Symyx) high throughput Parallel Polymerization Reactor (PPR) system. The PPR system includes an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst, ligand, and metal precursor solutions, unless otherwise noted, are prepared in toluene. All liquids (i.e. solvent, 1-octene, and catalyst solutions) are added via robotic syringes. Gaseous reagents (i.e. ethylene) are added via a gas injection port. Prior to each run, the reactors were heated to 80° C., purged with ethylene, and vented. A portion of ISOPAR-E is added. The reactors are heated to the run temperature, and then the reaction is pressurized to the appropriate psig with ethylene. Toluene solutions of reagents are added in the following order: 1-octene with scavenger MMAO-3A (500 nmol for 120° C. runs and 750 nmol for 150° C. runs), activator (bis(hydrogenated tallow alkyl)methylammonium tetrakis (pentafluorophenyl)borate, tris(pentafluorophenyl)borane, etc), then catalyst. The 1-octene:ethylene molar ratio was 2.24.

Each liquid addition is chased with a small amount of ISOPAR-E so that after the final addition, a total reaction volume reaches 5 mL. Upon addition of the catalyst, the PPR software monitors the pressure of each cell. The desired pressure (150 psig for 120° C. runs and 213 psig for 150° C. runs, within approximately 2-6 psi) is maintained by the supplemental addition of ethylene gas by opening the valve at the set point minus 1 psi and closing the valve when the pressure reaches 2-6 psi. All drops in pressure are cumulatively recorded as "Uptake" or "Conversion" of the ethylene for the duration of the run or until the uptake or conversion requested value is reached, whichever occurs first in time. Each reaction is then quenched by addition of 10% carbon monoxide in argon for 4 minutes at 40-50 psi higher than the reactor pressure. Shorter "Quench Times" indicate a more active catalyst. In order to prevent the formation of too much polymer in any given cell, the reaction is quenched upon reaching a predetermined uptake level (50 psig for 120° C. runs and 75 psig for 150° C. runs).

After all the reactors are quenched, they are cooled to 70° C. The reactors are vented, purged for 5 minutes with nitrogen to remove carbon monoxide, and the tubes are removed. The polymer samples are then dried in a centrifugal evaporator at 70° C. for 12 hours, weighed to determine polymer yield and submitted for IR (1-octene incorporation) and GPC (molecular weight) analysis.

EXAMPLES

One or more features of the present disclosure are illustrated in view of the examples as follows:

Example 1

Synthesis of methyl 4-bromo-3-methoxythiophene-2-carboxylate 2

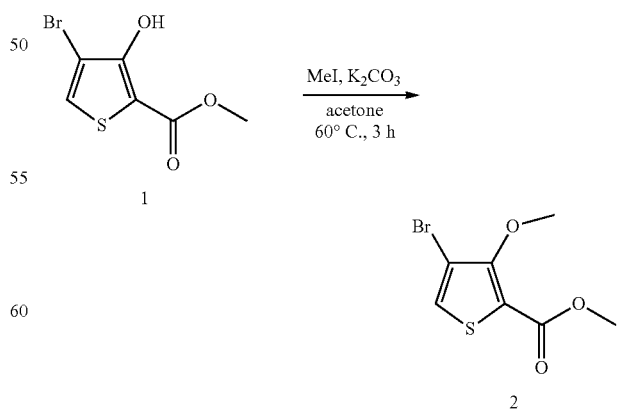

Compound 1 (1.000 g, 4.22 mmol) was dissolved in 40 mL of acetone. Potassium carbonate (2.915 g, 21.09 mmol)

was added followed by iodomethane (2.36 mL, 37.96 mmol; d 2.28). The resulting mixture was heated at 60° C. for 14 hours. The reaction mixture was allowed to cool to 23° C. and then filtered through a pad of Celite, which was then rinsed with methylene chloride (20 mL). The filtrate was concentrated under vacuum and the residue was taken up in 80 mL of methylene chloride and the small amount of white solids was removed by filtration. The solvent was removed under vacuum giving a yellow solid (1.01 g, 95%).

$^1$H NMR (400 MHz, CDCl$_3$) δ 7.39 (s, 1H), 4.01 (s, 3H), 3.88 (s, 3H).

Example 2

Synthesis of 4-bromo-3-methoxythiophene-2-carboxylic acid 3

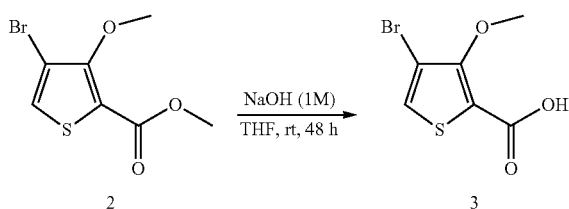

Compound 2 (1.000 g, 3.98 mmol) was dissolved in 15 mL THF, and mixed with a 1.0 M sodium hydroxide aqueous solution (5.2 mL, 5.18 mmol). The mixture was stirred at room temperature for 48 h.

Aqueous HCl (1.0 M) was added dropwise to the mixture until pH was approximately 2. The acidic mixture was extracted with CH$_2$Cl$_2$ (60 mL×2). Brine was added to assist phase separation. The combined organic extracts were concentrated using a rotary evaporator to obtain a residue, which was mixed with 100 mL of CH$_2$Cl$_2$. Some white material stayed undissolved. These solids were filtered off (found to be water soluble). The filtrate was washed with water (60 mL×2), dried with Na$_2$SO$_4$, and concentrated under reduced pressure to a solid (0.55 g, 58%).

$^1$H NMR (400 MHz, CDCl$_3$) δ 7.51 (s, 1H), 4.08 (s, 3H).

Example 3: Synthesis of 3-bromo-4-methoxythiophene 4

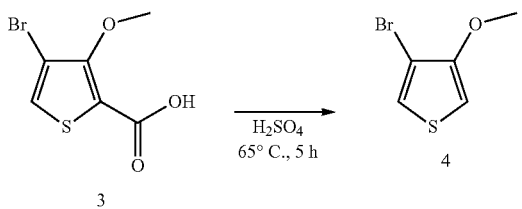

Compound 3 (0.550 g, 2.32 mmol) was treated with 15 mL of conc. H$_2$SO$_4$ at 65° C. for 5 hours in a scintillation vial equipped with a pressure-relief septum cap. (Note: it was important to use a vent needle or some other way to relieve pressure as this reaction produces CO$_2$ gas.) After cooling to room temperature, the mixture was poured into 20 mL of crushed ice, and extracted with methylene chloride (3×100 mL). The organic extracts were combined, washed successively with sat. aqueous NaHCO$_3$ (2×80 mL), and water (2×100 mL). The organic layer was passed through a plug of silica gel and concentrated under vacuum to a dark brown oil (0.3 g, 67%). Solvent removal needed to be done quickly due to volatility of the product. GC/MS confirmed pure desired product (m/z=193).

$^1$H NMR (400 MHz, CDCl$_3$) δ 7.20 (d, J=3.5 Hz, 1H), 6.25 (d, J=3.5 Hz, 1H), 3.88 (s, 3H).

Example 4

Synthesis of Ligand L1

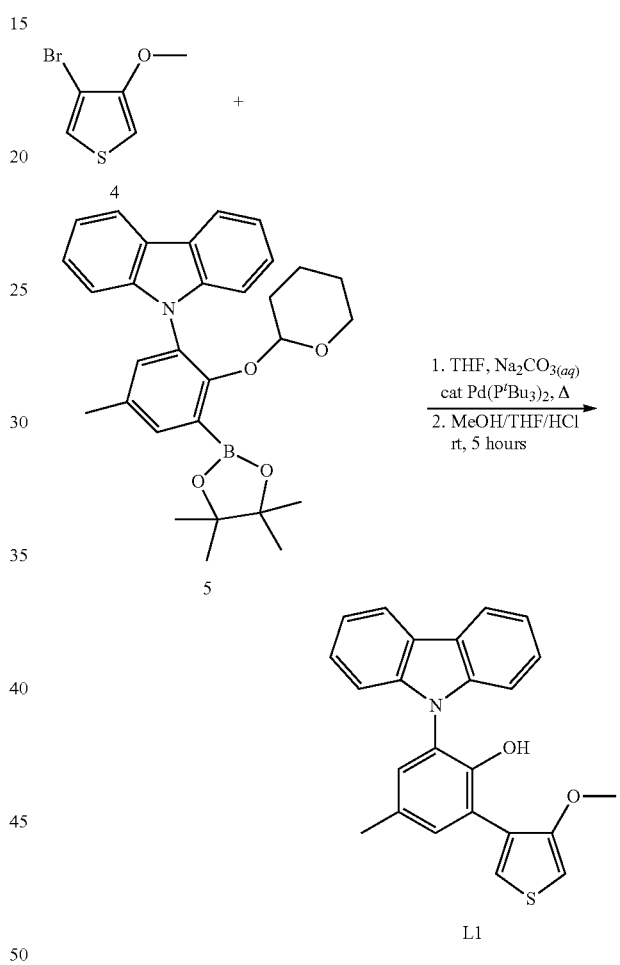

Compound 4 (0.080 g, 0.41 mmol) and compound 5 (0.200 g, 0.41 mmol, purchased from Boulder Scientific) were dissolved in 4 mL THF. Na$_2$CO$_3$ (0.264 g, 2.49 mmol) was dissolved in 1 mL of deionized water and added to the THF solution forming a biphasic solution, which was then sparged with N$_2$ for 30 min. Pd(P$^t$Bu3)$_2$ (0.011 g, 0.021 mmol) was dissolved in 0.5 mL degassed THF in a nitrogen-filled drybox, and then added to the reaction mixture via syringe. The biphasic mixture was stirred vigorously at 65° C. for 14 hours. The reaction mixture was allowed to cool to 25° C. and the aqueous phase was separated and discarded. The organic phase was diluted with 30 mL THF and the solution was passed through a short plug of silica gel. The filtrate was concentrated on a rotary evaporator. The crude protected product was used in the next step without further purification.

$^1$H NMR (400 MHz, C$_6$D$_6$) δ 8.09 (dt, J=7.6, 0.9 Hz, 2H), 7.37-7.21 (m, 7H), 7.03 (d, J=3.5 Hz, 1H), 6.84 (d, J=1.9 Hz, 1H), 6.27 (s, 1H), 5.72 (d, J=3.5 Hz, 1H), 3.01 (s, 3H), 2.06 (s, 3H).

The crude protected product was dissolved in 4 mL of a ca 1:2 mixture of MeOH and THF, concentrated HCl (4 drops from a Pasteur pipette) was added and the solution stirred at 23° C. for 5 hours. The solution was evaporated to dryness under vacuum and the residue was dissolved in 40 mL of Et$_2$O, passed through a short plug of silica gel and the solvent was removed under vacuum. The brown crude product was purified using a Biotage (EtOAc/hexane gradient: 5% to 10% EtOAc over 8 column volume (CV), then held at 10%). Fractions containing the pure product were combined and concentrated on a rotary evaporator. The product was further dried under high vacuum overnight to obtain L1 as a white solid (0.130 g, 81%).

$^1$H NMR (400 MHz, CDCl$_3$) δ 8.20-8.11 (m, 2H), 7.45-7.38 (m, 3H), 7.36 (d, J=1.8 Hz, 1H), 7.31-7.28 (m, 3H), 7.27-7.26 (m, 1H), 6.46-6.41 (m, 2H), 3.90 (s, 3H), 2.40 (s, 3H). $^{13}$C NMR (101 MHz, CDCl$_3$) δ 154.84, 147.78, 141.12, 131.41, 130.52, 129.35, 129.31, 125.80, 125.37, 124.30, 123.77, 123.36, 120.23, 119.72, 110.31, 98.19, 57.97, 20.55.

Example 5

Synthesis of Ligand L2

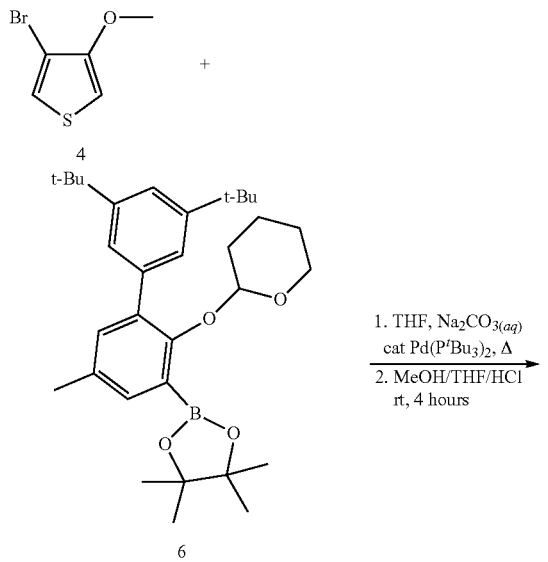

Compound 4 (0.100 g, 0.52 mmol) and compound 6 (0.262 g, 0.52 mmol, purchased from Boulder Scientific) were dissolved in 4 mL THF. Na$_2$CO$_3$ (0.329 g, 3.11 mmol) was dissolved in 1 mL of deionized water and added to the THF solution forming a biphasic solution, which was then sparged with N$_2$ for 30 min. Pd(Pt-Bu$_3$)$_2$ (0.013 g, 0.026 mmol) was dissolved in 0.5 mL degassed THF in a nitrogen-filled drybox, and then added to the reaction mixture via syringe. The biphasic mixture was stirred vigorously at 65° C. for 14 hours. The reaction mixture was allowed to cool to 25° C. and the aqueous phase was separated and discarded. The organic phase was diluted with 30 mL THF and the solution was passed through a short plug of silica gel. The filtrate was concentrated on a rotary evaporator. The crude protected product was dissolved in 16 mL of a ca 1:1 mixture of MeOH and THF, concentration HCl (4 drops from a Pasteur pipette) was added and the solution stirred at 23° C. for 4 hours. The solution was evaporated to dryness under vacuum and the residue was dissolved in 100 mL of EtOAc/hexane (10% EtOAc), passed through a short plug of silica gel and the solvent was removed under vacuum to afford L2 as a beige solid in quantitative yield.

$^1$H NMR (400 MHz, CDCl$_3$) δ 7.45 7.41 (m, 2H), 7.39 (d, J=1.8 Hz, 2H), 7.32 (d, J=3.4 Hz, 1H), 7.14 (d, J=2.7 Hz, 2H), 6.42 (d, J=3.4 Hz, 1H), 6.17 (s, 1H), 3.90 (s, 3H), 2.36 (s, 3H), 1.37 (s, 18H). $^{13}$C NMR (101 MHz, CDCl$_3$) δ 155.32, 150.63, 147.98, 137.35, 131.21, 130.92, 130.56, 130.06, 129.62, 123.89, 123.80, 122.16, 121.28, 97.72, 57.86, 34.94, 31.53, 31.48, 20.56.

Example 6: Synthesis of Ligand L3

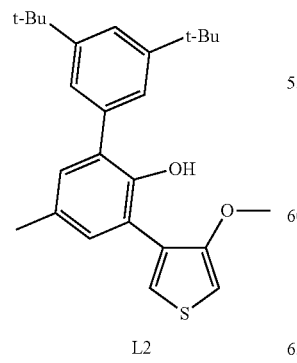

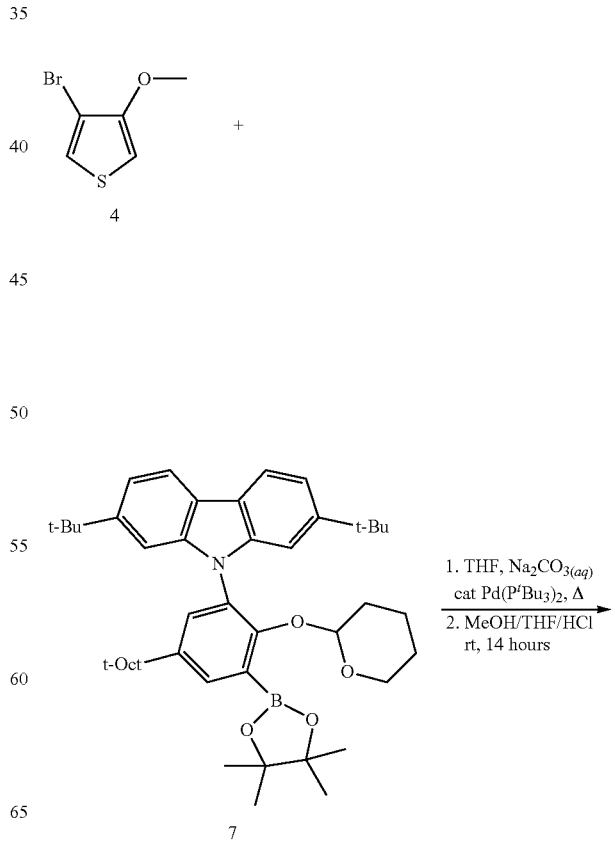

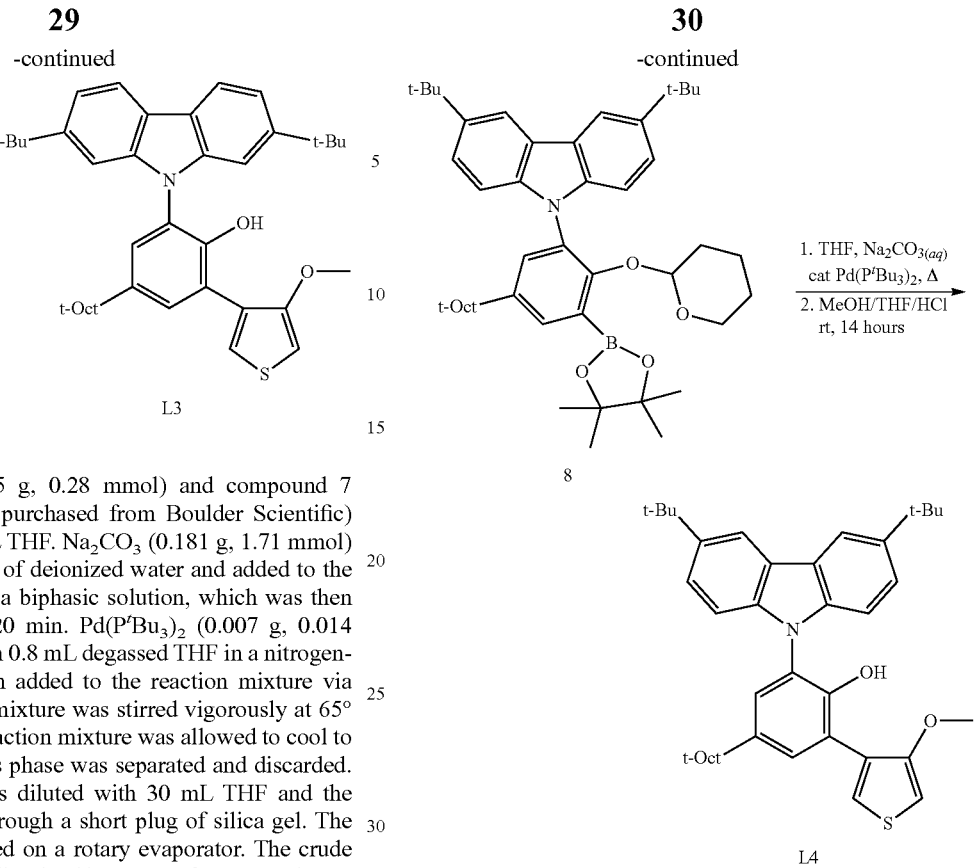

Compound 4 (0.055 g, 0.28 mmol) and compound 7 (0.198 g, 0.28 mmol, purchased from Boulder Scientific) were dissolved in 4 mL THF. Na$_2$CO$_3$ (0.181 g, 1.71 mmol) was dissolved in 1 mL of deionized water and added to the THF solution forming a biphasic solution, which was then sparged with N$_2$ for 20 min. Pd(P$^t$Bu$_3$)$_2$ (0.007 g, 0.014 mmol) was dissolved in 0.8 mL degassed THF in a nitrogen-filled drybox, and then added to the reaction mixture via syringe. The biphasic mixture was stirred vigorously at 65° C. for 14 hours. The reaction mixture was allowed to cool to 25° C. and the aqueous phase was separated and discarded. The organic phase was diluted with 30 mL THF and the solution was passed through a short plug of silica gel. The filtrate was concentrated on a rotary evaporator. The crude protected product was dissolved in 16 mL of a ca 1:1 mixture of MeOH and THF, concentration HCl (4 drops from a Pasteur pipette) was added and the solution stirred at 25° C. for 14 hours. The solution was evaporated to dryness under vacuum and the residue was dissolved in 100 mL of EtOAc/hexane (10% EtOAc), passed through a short plug of silica gel and the solvent was removed under vacuum to afford L3 as a beige solid (0.165 g, 97%). LC/MS confirmed pure desired product (m/z=596).

$^1$H NMR (400 MHz, CDCl$_3$) δ 8.02 (d, J=8.2 Hz, 2H), 7.59 (d, J=2.4 Hz, 1H), 7.45 (d, J=3.4 Hz, 1H), 7.37 (d, J=2.6 Hz, 1H), 7.34 (d, J=1.7 Hz, 1H), 7.32 (d, J=1.7 Hz, 1H), 7.20 (d, J=1.4 Hz, 2H), 6.45 (d, J=3.4 Hz, 1H), 6.11 (s, 1H), 3.94 (s, 3H), 1.76 (s, 2H), 1.40 (s, 6H), 1.37 (s, 18H), 0.84 (s, 9H). $^{13}$C NMR (101 MHz, CDCl$_3$) δ 155.36, 149.09, 147.68, 142.59, 141.57, 129.74, 128.82, 126.66, 124.66, 124.23, 122.72, 121.09, 119.64, 119.43, 118.21, 117.66, 106.63, 106.29, 97.81, 57.90, 57.20, 38.24, 35.14, 32.51, 31.90, 31.80, 31.73, 31.58.

Example 7

Synthesis of Ligand L4

Compound 4 (0.059 g, 0.31 mmol) and compound 8 (0.212 g, 0.31 mmol, purchased from Boulder Scientific) were dissolved in 4 mL THF. Na$_2$CO$_3$ (0.194 g, 1.83 mmol) was dissolved in 1 mL of deionized water and added to the THF solution forming a biphasic solution, which was then sparged with N$_2$ for 15 min. Pd(P$^t$Bu$_3$)$_2$ (0.008 g, 0.015 mmol) was dissolved in 0.8 mL degassed THF in a nitrogen-filled drybox, and then added to the reaction mixture via syringe. The biphasic mixture was stirred vigorously at 65° C. for 14 hours. The reaction mixture was allowed to cool to 25° C. and the aqueous phase was separated and discarded. The organic phase was diluted with 30 mL THF and the solution was passed through a short plug of silica gel. The filtrate was concentrated on a rotary evaporator. The crude protected product was dissolved in 16 mL of a 1:1 mixture of MeOH and THF, concentrated HCl (4 drops from a Pasteur pipette) was added and the solution stirred at 25° C. for 14 hours. The solution was evaporated to dryness under vacuum and the residue was dissolved in 100 mL of EtOAc/hexane (10% EtOAc), passed through a short plug of silica gel and the solvent was removed under vacuum to afford L4 as a beige solid (0.170 g, 93%). LC/MS confirmed pure desired product (m/z=596).

$^1$H NMR (400 MHz, CDCl$_3$) δ 8.17 (d, J=1.8 Hz, 2H), 7.56 (d, J=2.4 Hz, 1H), 7.48 (d, J=1.9 Hz, 1H), 7.46 (d, J=1.9 Hz, 1H), 7.43 (d, J=3.4 Hz, 1H), 7.38 (d, J=2.4 Hz, 1H), 7.17 (s, 1H), 7.14 (s, 1H), 6.43 (d, J=3.4 Hz, 1H), 6.27 (s, 1H), 3.90 (s, 3H), 1.75 (s, 2H), 1.48 (s, 18H), 1.39 (s, 6H), 0.84 (s, 9H). $^{13}$C NMR (101 MHz, CDCl$_3$) δ 155.19, 147.53, 142.65, 142.53, 139.64, 129.70, 128.70, 126.66, 124.95, 124.19, 123.56, 123.29, 122.68, 116.27, 109.55, 97.90, 57.87, 57.06, 38.21, 34.72, 32.44, 32.06, 31.88, 31.58.

Example 8

Synthesis of 2-bromo-3-methoxythiophene 10

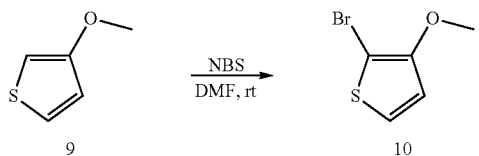

The synthesis of compound 10 was based on *JACS* 2012, 134(46), 19070. A solution of N-bromosuccinimide (1.840 g, 10.34 mmol) in dry DMF (6 mL) has been added dropwise to a solution of 3-methoxythiophene (1.180 g, 10.34 mmol) in dry DMF (4 mL). After 1 h, the reaction mixture was partitioned between water and dichloromethane (30 mL each). The aqueous layer was washed with dichloromethane (30 mL) and then the combined dichloromethane layers were washed with brine (2×30 mL), dried over $Na_2SO_4$, and the solvent was removed under reduced pressure. The crude product was dissolved in 100 mL of hexane and passed through a plug of silica gel. Solvent removal afforded the pure product as a pale yellow liquid (1.500 g, 75%).

Important note: the pure product was not stable at 25° C. on air. Significant decomposition took place within an hour. Stability at low temperature and/or under inert atmosphere was not tested.

$^1$H NMR (400 MHz, $CDCl_3$) δ 7.21 (d, J=6.0 Hz, 1H), 6.77 (d, J=6.0 Hz, 1H), 3.90 (s, 3H).

Example 9

Synthesis of Ligand L5

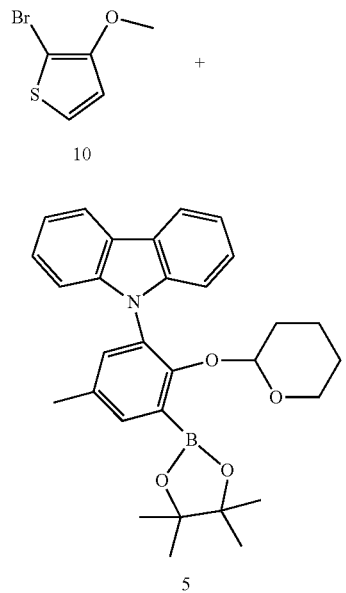

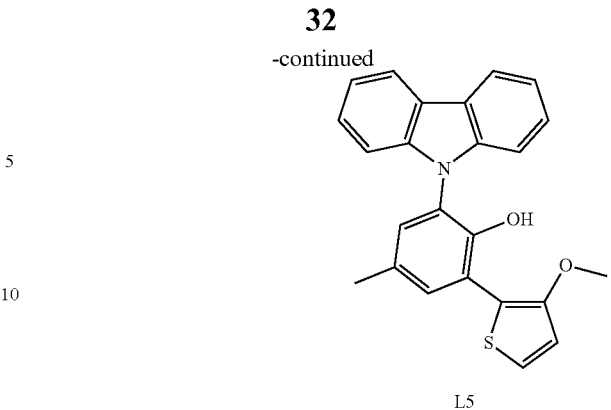

Compounds 5 (0.228 g, 0.47 mmol) and 10 (0.091 g, 0.47 mmol) were dissolved in 10 mL THF. $Na_2CO_3$ (0.300 g, 2.83 mmol) was dissolved in 5 mL of deionized water and added to the THF solution forming a biphasic solution, which was then sparged with $N_2$ for 20 min. $Pd(P^tBu_3)_2$ (0.012 g, 0.024 mmol) was dissolved in 2 mL degassed THF in a nitrogen-filled drybox, and then added to the reaction mixture via syringe. The reaction mixture was stirred vigorously at 65° C. for 14 hours. The reaction mixture was allowed to cool to 25° C. The aqueous phase was separated and discarded. The organic phase was mixed with 30 mL of $Et_2O$, and the solution was passed through a plug of silica gel. The solvent was removed under vacuum to give a yellow residue—a protected product.

$^1$H NMR (400 MHz, $CDCl_3$) δ 8.20-8.13 (m, 2H), 7.46-7.36 (m, 3H), 7.34 (d, J=5.6 Hz, 1H), 7.32-7.27 (m, 3H), 7.26-7.23 (m, 2H), 6.92 (d, J=5.6 Hz, 1H), 3.92 (s, 3H), 2.40 (s, 3H).

The yellow residue, the protected product, was dissolved in 20 mL of a 1:1 (v/v) mixture of MEOH and THF, concentrations HCl (5 drops from a Pasteur pipette) was added and the solution stirred at 25° C. for 3 hours. The reaction mixture was evaporated to dryness, the residue was dissolved in a mixture of 50 mL diethyl ether and 50 mL hexane, and the solution was passed through a plug of silica gel. Solvent removal under vacuum afforded ligand L5 (0.150 g, 83%).

$^1$H NMR (400 MHz, $C_6D_6$) δ 8.11 (dt, J=7.7, 1.1 Hz, 2H), 7.48 (dd, J=2.2, 0.7 Hz, 1H), 7.38-7.20 (m, 7H), 6.87 (dt, J=2.2, 0.6 Hz, 1H), 6.69 (d, J=5.6 Hz, 1H), 6.21 (d, J=5.6 Hz, 1H), 2.94 (s, 3H), 2.02 (s, 3H). $^{13}$C NMR (101 MHz, $CDCl_3$) δ 151.34, 147.93, 141.19, 130.88, 130.53, 129.51, 126.04, 125.69, 125.11, 123.25, 121.87, 120.19, 119.54, 118.31, 116.46, 110.32, 59.43, 20.52

Example 10

Synthesis of propane-1,3-diyl bis(trifluoromethanesulfonate) 13

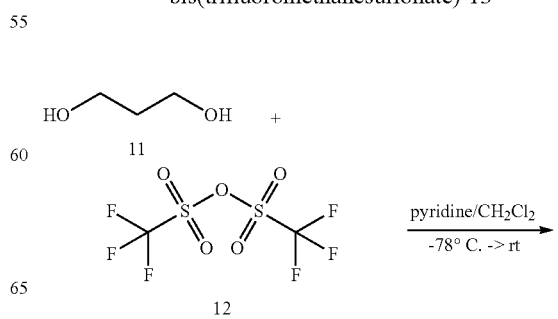

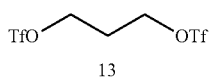

A solution of 1,3-propanediol (2.9 mL, 40.0 mmol) and pyridine (6.5 mL, 80 mmol; d 0.978) in dry dichloromethane (100 mL) was cooled to −78° C. under nitrogen and Tf$_2$O (13.5 mL, 80.0 mmol; d 1.677) was added dropwise. The reaction mixture was warmed to 25° C. and stirred for 1 h to give a pink solution with a white precipitate. The reaction mixture was washed with deionized water quickly (3×20 mL), dried over anhydrous Na$_2$SO$_4$ and filtered through silica gel quickly. The silica gel was washed with dichloromethane (50 mL) and the filtrate was combined with the first washing. The solvent was removed under vacuum to afford compound 13 as a pale red oil (7.5 g, 55%). The product should be stored under inert atmosphere.

$^1$H NMR (400 MHz, CDCl$_3$) δ 4.67 (t, J=5.8 Hz, 4H), 2.36 (p, J=5.8 Hz, 2H). $^{13}$C NMR (101 MHz, CDCl$_3$) δ 118.54 (q, J=320.0 Hz), 71.43, 29.27.

Example 11

Synthesis of butane-1,4-diyl bis(trifluoromethanesulfonate) 15

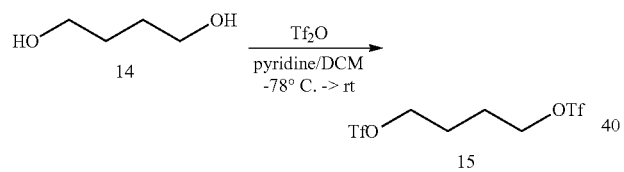

A solution of 1,4-butanediol (1.000 g, 11.10 mmol) and pyridine (2.69 mL, 33.30 mmol; d 0.978) in dry dichloromethane (60 mL) was cooled to −78° C. under nitrogen and Tf$_2$O (4.67 mL, 27.74 mmol; d 1.677) was added dropwise. The reaction mixture was warmed to 25° C. and stirred for 14 hours to give a pink solution with a white precipitate. The reaction mixture was washed with deionized water quickly (3×50 mL), dried over anhydrous Na$_2$SO$_4$ and filtered through Celite. The solvent was removed under vacuum to give the desired product as an oil. Pentane (30 mL) was added forming a separate phase over the oil, so it was removed under vacuum. As the system cooled while under vacuum the oil turned into an off-white solid (2.3 g, 59%). The product was stored under inert atmosphere at −30° C.

$^1$H NMR (400 MHz, CDCl$_3$) δ 4.59 (m, 4H), 2.02 (m, 4H). $^{13}$C NMR (101 MHz, CDCl$_3$) δ 118.57 (q, J=319.4 Hz), 75.74, 25.37. $^{19}$F NMR (376 MHz, CDCl$_3$) δ −74.62 (non-calibrated).

Example 12

Synthesis of Compound 16

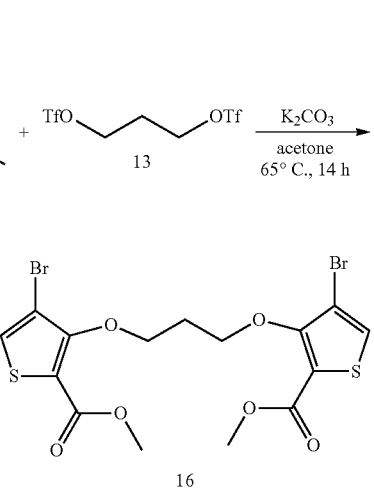

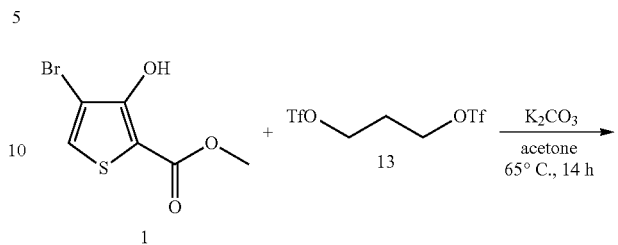

Compound 1 (0.100 g, 0.42 mmol) was dissolved in 5 mL of acetone (solvent dried over MgSO$_4$). Potassium carbonate (0.291 g, 2.11 mmol) was added followed by compound 13 (0.070 g, 0.21 mmol). The resulting mixture was heated at 65° C. for 14 hours. The mixture was filtered and the filter cake rinsed with dichloromethane (30 mL). The combined filtrate was concentrated under vacuum. Dichloromethane (50 mL) was added (some of the material was insoluble) and the mixture was filtered through a Celite pad. The filtrate was evaporated to dryness under vacuum (0.100 g, 94%). LC/MS confirmed the product as a sodiated adduct (m/z=537).

$^1$H NMR (400 MHz, CDCl$_3$) δ 7.38 (s, 2H), 4.47 (t, J=6.2 Hz, 4H), 3.87 (s, 6H), 2.34 (p, J=6.2 Hz, 2H).

Example 13

Synthesis of Compound 17

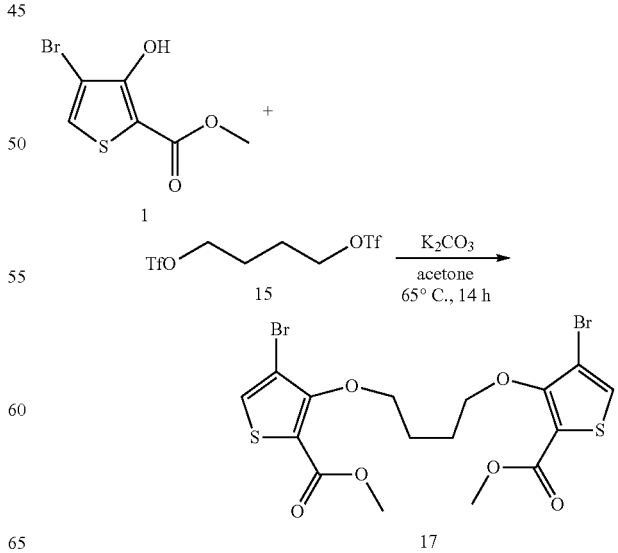

Compound 1 (0.500 g, 2.11 mmol) was dissolved in 50 mL of acetone (solvent was dried over MgSO$_4$). Potassium carbonate (1.457 g, 10.55 mmol) was added followed by compound 15 (0.366 g, 1.03 mmol). The resulting mixture was heated at 65° C. for 14 hours. The mixture was filtered and the filter cake rinsed with dichloromethane (100 mL). The combined filtrate was concentrated under vacuum. Dichloromethane (50 mL) was added and the mixture was filtered through a Celite pad. The filtrate was evaporated to dryness under vacuum to give an orange oil (0.526 g, 48%).

$^1$H NMR (400 MHz, CDCl$_3$) δ 7.38 (s, 2H), 4.26 (m, 4H), 3.87 (s, 6H), 2.09 (m, 4H). $^{13}$C NMR (101 MHz, CDCl$_3$) δ 160.76, 157.92, 127.07, 127.01, 116.91, 108.83, 75.22, 52.11, 26.64.

Example 14

Synthesis of Compound 18

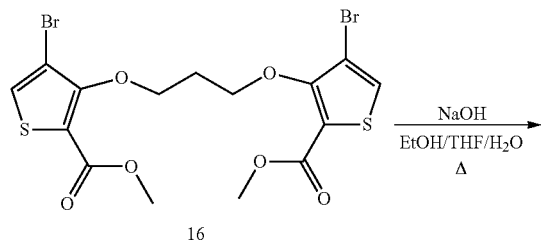

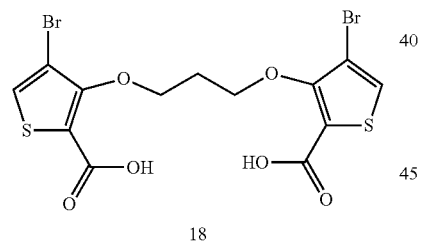

The synthesis was based on WO2002038572A1 for 3-bromo-4-hexyloxythiophene-2-carboxylic acid. To a solution of compound 16 (0.220 g, 0.43 mmol) in 5 mL of ethanol (containing 2 mL THF to improve solubility) was added a solution of NaOH (0.510 g, 12.84 mmol) in 3 mL of water. The mixture was stirred vigorously at 70° C. for 14 hours. After allowing the reaction mixture to cool to 25° C., it was acidified with concentration HCl to pH 1 and extracted with Et$_2$O (2×30 mL). The organic phase was washed with water (3×50 mL), dried over Na$_2$SO$_4$ and the solvent was removed under reduced pressure to give a white solid (0.200 g, 96%). The solubility of the product in CDCl$_3$ was low, however, it slowly dissolved in acetone-d$_6$.

$^1$H NMR (400 MHz, acetone-d$_6$) δ 7.82 (s, 2H), 4.52 (t, J=6.3 Hz, 4H), 2.32 (p, J=6.3 Hz, 2H). $^{13}$C NMR (101 MHz, acetone-d$_6$) δ 161.49, 158.42, 128.67, 118.19, 108.97, 73.44, 31.80.

Example 15

Synthesis of Compound 19

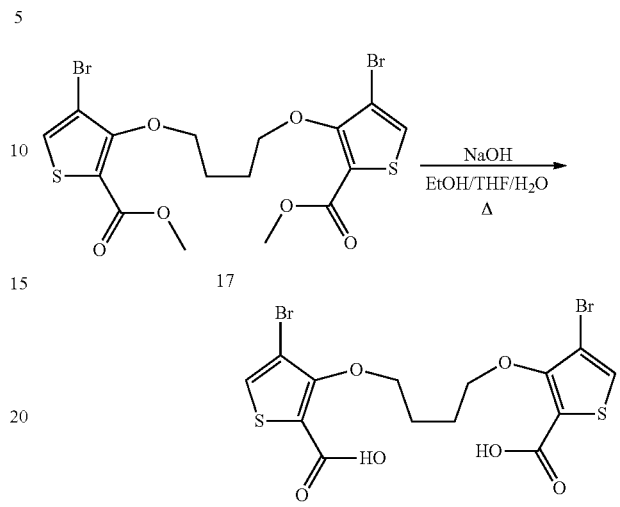

To a solution of compound 17 (0.510 g, 0.97 mmol) in a mixture of 10 mL of ethanol and 8 mL THF was added a solution of NaOH (1.16 g, 28.96 mmol) in 6 mL of water. The mixture was stirred vigorously at 70° C. for 14 hours. After allowing the reaction mixture to cool to 25° C., it was acidified with concentration HCl to pH=1 and extracted with Et$_2$O (2×80 mL). The organic phase was washed with water (3×60 mL), dried over Na$_2$SO$_4$, filtered through Celite, and the solvent was removed under reduced pressure to give an off-white solid (0.440 g, 91%). The product was taken into the next step (decarboxylation) without further purification.

$^1$H NMR (400 MHz, acetone-d$_6$) δ 7.81 (s, 2H), 4.31 (m, 4H), 2.07 (m, 4H).

Example 16

Synthesis of Compound 20

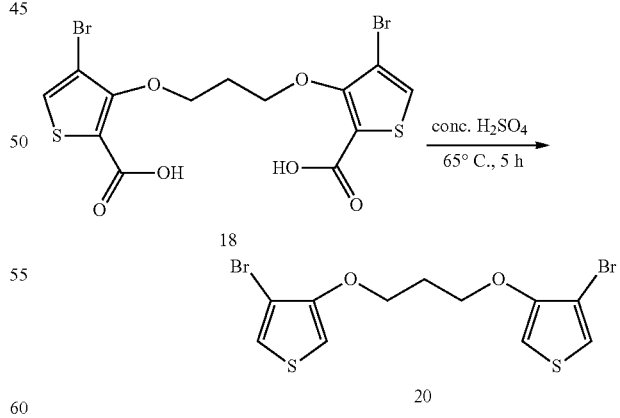

The synthesis was based on PCT Int. Appl., 2004033440. In a 40 mL scintillation vial equipped with a pressure-release septum cap compound 18 (0.200 g, 0.41 mmol) was treated with 5 mL of conc. H$_2$SO$_4$ at 65° C. for 5 hours. During this time a vent needle was used to relieve pressure caused by CO$_2$ release.

After allowing the reaction mixture to cool to room temperature, it was poured into 50 mL of crushed ice and extracted with dichloromethane (3×40 mL). The combined organic phase was washed successively with H$_2$O (2×30 mL), saturated aqueous NaHCO$_3$ (2×30 mL), and brine (2×40 mL). The organic layer was passed through a short plug of silica gel and concentrated under vacuum (0.135 g, 82%). NMR showed slightly impure product. It was taken into the next step without further purification.

$^1$H NMR (400 MHz, CDCl$_3$) δ 7.18 (d, J=3.5 Hz, 2H), 6.30 (d, J=3.5 Hz, 2H), 4.21 (t, J=6.0 Hz, 4H), 2.34 (p, J=6.0 Hz, 2H). $^{13}$C NMR (101 MHz, CDCl$_3$) δ 153.40, 122.05, 103.26, 97.66, 67.00, 28.90.

Example 17

Synthesis of Compound 21

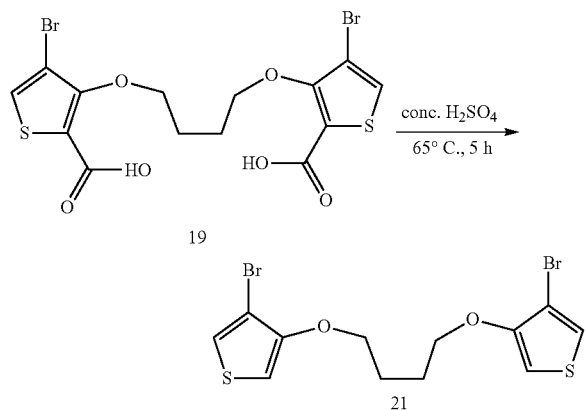

In a 40 mL scintillation vial equipped with a pressure-release septum cap compound 19 (0.440 g, 0.88 mmol) was treated with 10 mL of conc. H$_2$SO$_4$ at 65° C. for 5 hours. During this time a vent needle was used to relieve pressure caused by CO$_2$ release. After allowing the reaction mixture to cool to room temperature, it was poured into 100 mL of crushed ice and extracted with dichloromethane (3×60 mL). The combined organic phase was filtered through Celite and then washed successively with H$_2$O (2×60 mL), sat. aq. NaHCO$_3$ (2×60 mL), and brine (2×60 mL). The organic layer was passed through a short plug of silica gel (some product was lost due to a minor spill at this stage) and concentrated under vacuum (0.075 g).

$^1$H NMR (400 MHz, CDCl$_3$) δ 7.18 (d, J=3.5 Hz, 2H), 6.25 (d, J=3.5 Hz, 2H), 4.09 (m, 4H), 2.05 (m, 4H).

Example 18

Synthesis of Ligand L6

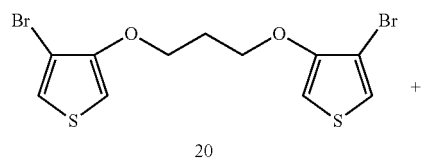

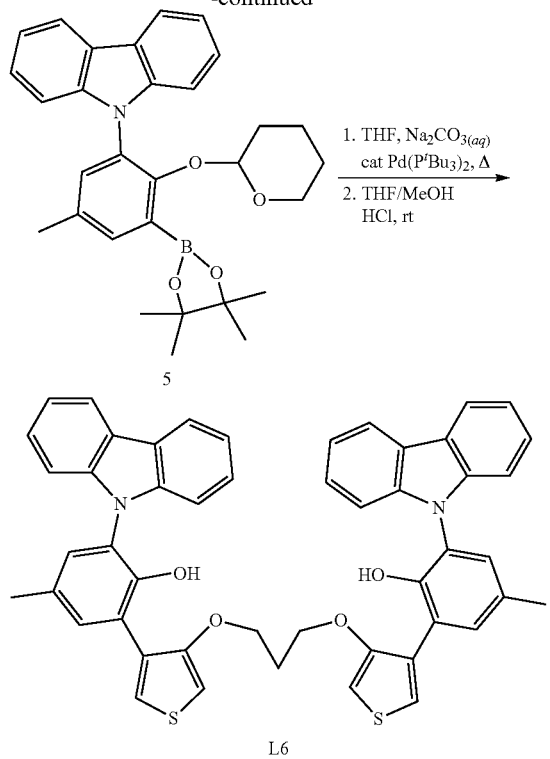

Compounds 5 (0.291 g, 0.60 mmol) and 20 (0.120 g, 0.30 mmol) were dissolved in 10 mL THF. Na$_2$CO$_3$ (0.383 g, 3.62 mmol) was dissolved in 2 mL of water and added to the THF solution forming a biphasic solution, which was then sparged with N$_2$ for 20 min. Pd(P$^t$Bu$_3$)$_2$ (0.015 g, 0.030 mmol) was dissolved in 0.8 mL degassed THF in a nitrogen-filled drybox, and then added to the reaction mixture via syringe. The reaction mixture was stirred vigorously at 65° C. for 14 hours. The reaction mixture was allowed to cool to 25° C. The aqueous phase was separated and discarded. The organic phase was diluted with 30 mL THF and the solution was passed through a short plug of silica gel. The filtrate was concentrated on a rotary evaporator and the residue was dissolved in 16 mL of a 1:1 (v/v) mixture of MEOH and THF, 4 drops of conc HCl were added and the solution was stirred at 25° C. for 4 hours. The solution was evaporated to dryness under vacuum and the residue was dissolved in 150 mL of EtOAc/hexane (30% v/v EtOAc), passed through a short plug of silica gel and the solvent was removed under vacuum to give a beige solid (0.220 g). Biotage purification was performed using a gradient of EtOAc in hexane as the eluent (2% to 20% EtOAc over 11 CV, then held at 20%). The desired product fractions (first main eluted material) were combined and evaporated to dryness under vacuum to give a white solid (0.140 g, 61%). Since acetone was used to rinse the Biotage tubes, residual acetone showed up in the NMR spectra, otherwise the product was pure. The solids were taken up in 5 mL of dichloromethane and solvent was removed under vacuum. High vacuum was applied on the solids overnight, but dichloromethane still showed up in the NMR. The product did not dissolve completely in CDCl$_3$, however, it slowly dissolved in C$_6$D$_6$.

$^1$H NMR (400 MHz, C$_6$D$_6$) δ 8.15 8.09 (m, 4H), 7.27 (pd, J=7.1, 1.4 Hz, 8H), 7.21-7.17 (m, 4H), 7.07 (dd, J=2.2, 0.5 Hz, 2H), 6.82 (d, J=3.4 Hz, 2H), 6.79 (dd, J=2.3, 0.6 Hz, 2H), 6.00 (s, 2H), 5.40 (d, J=3.4 Hz, 2H), 3.52 (t, J=5.9 Hz,

4H), 2.02 (s, 6H), 1.47 (p, J=5.9 Hz, 2H). $^{13}$C NMR (101 MHz, C$_6$D$_6$) δ 154.26, 149.15, 142.40, 132.40, 130.73, 130.16, 129.95, 126.52, 125.83, 124.61, 124.57, 124.51, 121.07, 120.58, 111.03, 99.27, 66.95, 28.94, 20.67.

Example 19

Synthesis of Ligand L7

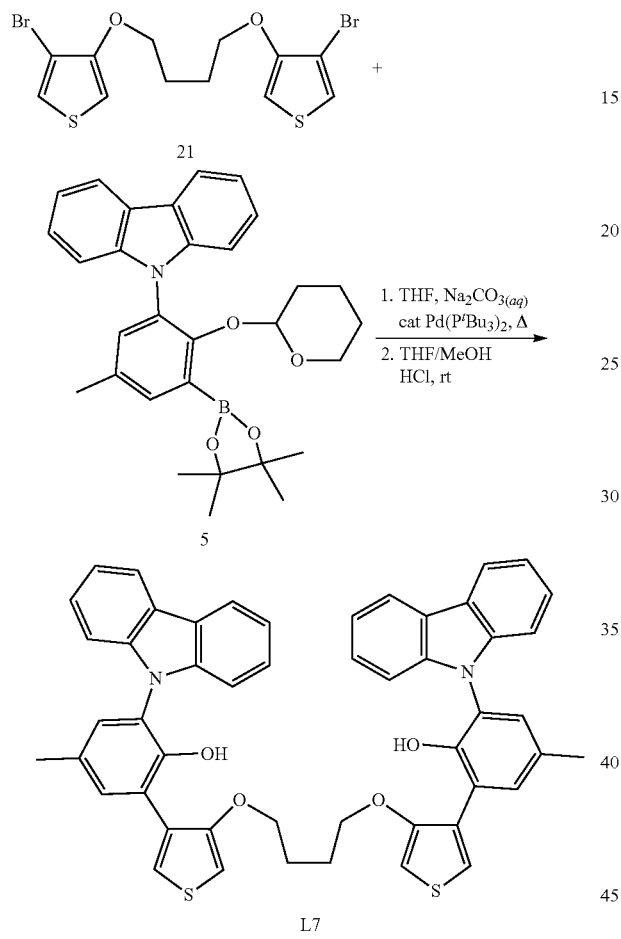

Compounds 5 (0.291 g, 0.60 mmol) and 21 (0.120 g, 0.30 mmol) were dissolved in 10 mL THF. Na$_2$CO$_3$ (0.383 g, 3.62 mmol) was dissolved in 4 mL of water and added to the THF solution forming a biphasic solution, which was then sparged with N$_2$ for 20 min. Pd(P$^t$Bu$_3$)$_2$ (0.015 g, 0.030 mmol) was dissolved in 0.8 mL degassed THF in a nitrogen-filled drybox, and then added to the reaction mixture via syringe. The reaction mixture was stirred vigorously at 65° C. for 14 hours. The reaction mixture was allowed to cool to 25° C. The aqueous phase was separated and discarded. The organic phase was diluted with 30 mL THF and the solution was passed through a short plug of silica gel. The filtrate was concentrated on a rotary evaporator and the residue was dissolved in 20 mL of a 1:1 (v/v) mixture of MEOH and THF, 5 drops of concentrated HCl were added and the solution was stirred at 25° C. for 3 hours. The solution was evaporated onto silica gel for Biotage purification, which was performed using a gradient of EtOAc in hexane as the eluent (2% to 20% EtOAc over 11 CV, then held at 20%).

The desired product fractions (eluted last) were combined and evaporated to dryness under vacuum to give a dark orange solid (0.072 g, 50%). LC/MS confirmed the desired product in form of a sodiated adduct (m/z=820). The product was taken up in diethyl ether (6 mL) and solvent was removed under vacuum. NMR still showed ether present.

$^1$H NMR (400 MHz, CDCl$_3$) δ 8.13 (dt, J=7.6, 0.9 Hz, 4H), 7.38 (d, J=3.4 Hz, 2H), 7.36 (d, J=1.2 Hz, 1H), 7.33 (m, 6H), 7.24 (br s, 2H), 7.22 (d, J=1.0 Hz, 1H), 7.20 (m, 6H), 6.41 (s, 2H), 6.24 (d, J=3.4 Hz, 2H), 3.95 (s, 4H), 2.35 (s, 6H), 1.84 (s, 4H). $^{13}$C NMR (101 MHz, CDCl$_3$) δ 153.60, 147.86, 141.22, 131.54, 130.51, 129.55, 129.41, 125.72, 125.33, 124.08, 123.85, 123.35, 120.24, 119.66, 110.16, 98.93, 70.44, 25.83, 20.50.

Example 20

Synthesis of Ligand L8

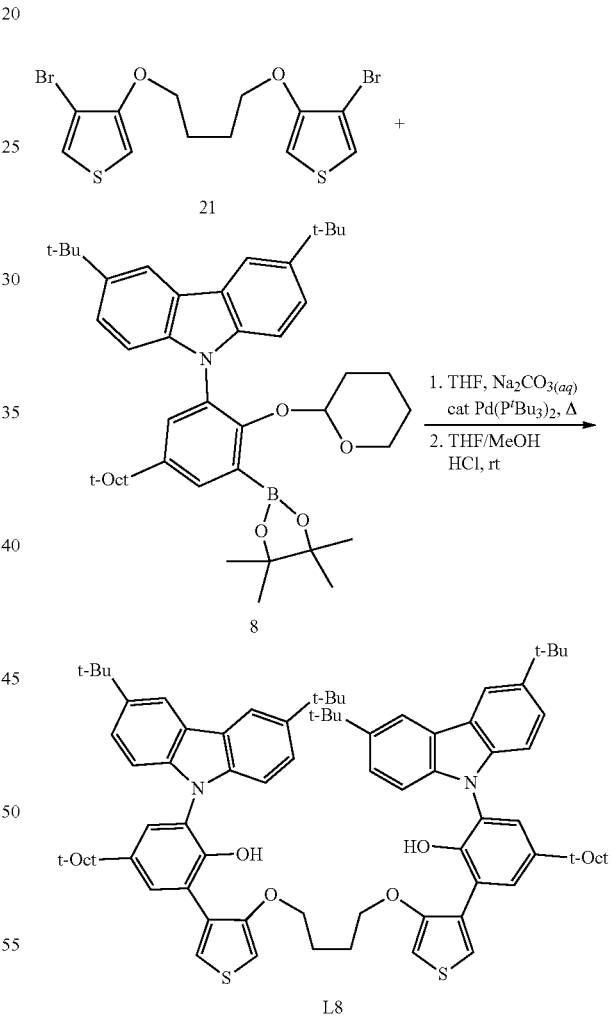

Compounds 8 (0.286 g, 0.41 mmol) and 22 (0.085 g, 0.21 mmol) were dissolved in 10 mL THF. Na$_2$CO$_3$ (0.262 g, 2.47 mmol) was dissolved in 4 mL of water and added to the THF solution forming a biphasic solution, which was then sparged with N$_2$ for 15 min. Pd(P$^t$Bu$_3$)$_2$ (0.011 g, 0.021 mmol) was dissolved in 0.8 mL degassed THF in a nitrogen-filled drybox, and then added to the reaction mixture via syringe. The reaction mixture was stirred vigorously at 65°

C. for 14 hours. The reaction mixture was allowed to cool to 25° C. The aqueous phase was separated and discarded. The organic phase was concentrated on a rotary evaporator and the resulting wet residue was dissolved in 50 mL $Et_2O$ and the small amount aqueous layer was removed with a pipette. The solution was passed through a short plug of silica gel. The filtrate was concentrated on a rotary evaporator and the residue was dissolved in 20 mL of a 1:2 (v/v) mixture of MEOH and THF, 5 drops of concentrated HCl were added and the solution was stirred at 25° C. for 14 hours. The reaction mixture was evaporated to dryness, redissolved in 50 mL of THF and evaporated onto silica gel. Biotage purification was performed using a gradient of EtOAc in hexane as the eluent (2% to 18% EtOAc over 10 CV). The desired product fractions (eluted last) were combined and evaporated to dryness under vacuum (0.080 g, 32%).

$^1$H NMR (400 MHz, $CDCl_3$) δ 8.16 (d, J=1.6 Hz, 4H), 7.53 (d, J=2.4 Hz, 2H), 7.44 (d, J=1.9 Hz, 2H), 7.41 (m, 4H), 7.35 (d, J=2.4 Hz, 2H), 7.11 (d, J=8.6 Hz, 4H), 6.29 (d, J=3.4 Hz, 2H), 6.10 (s, 2H), 4.01 (m, 4H), 1.91 (m, 4H), 1.70 (s, 4H), 1.45 (s, 36H), 1.35 (s, 12H), 0.80 (s, 18H). $^{13}$C NMR (101 MHz, $CDCl_3$) δ 154.16, 147.58, 142.58, 139.66, 129.64, 128.59, 126.66, 124.76, 124.09, 123.51, 123.33, 122.70, 116.28, 109.48, 98.60, 70.22, 57.08, 38.20, 34.71, 32.44, 32.05, 31.89, 31.56, 25.89.

Example 21

Synthesis of Compound 23

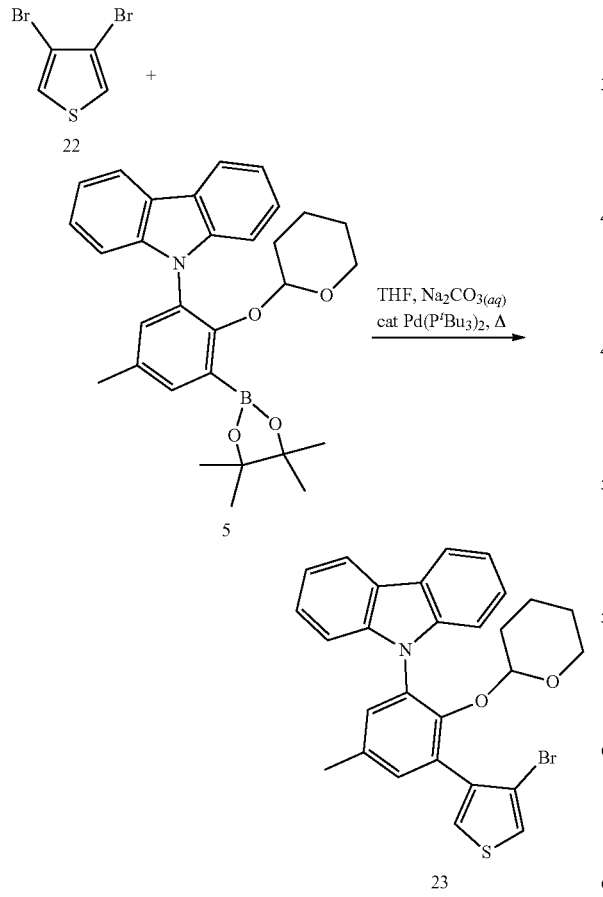

Compounds 5 (1.599 g, 3.31 mmol) and 22 (0.800 g, 3.31 mmol) were dissolved in 20 mL of THF. $Na_2CO_3$ (2.103 g, 19.84 mmol) was dissolved in 10 mL of water and added to the THF solution forming a biphasic solution, which was then sparged with $N_2$ for 30 min. $Pd(P^tBu_3)_2$ (0.068 g, 0.13 mmol) was dissolved in 1 mL of degassed THF in a nitrogen-filled drybox, then added to the reaction mixture via syringe. The reaction mixture was stirred vigorously at 65° C. overnight. The reaction mixture was allowed to cool to 25° C. and the aqueous phase was separated and discarded. The THF phase was dried over $Na_2SO_4$ and then evaporated onto silica gel for Biotage purification, which was performed using 5% (v/v) EtOAc in hexane as the eluent. The product fractions (second eluted material) were combined and the solvents were removed on a rotary evaporator. $Et_2O$ used to transfer the product from a flask into a vial was seen in the product NMR even after drying under vacuum. Yield: 0.701 g, 41%.

$^1$H NMR (400 MHz, $CDCl_3$) δ 8.15 8.08 (m, 2H), 7.46 7.41 (m, 8H), 7.38 (d, J=3.5 Hz, 1H), 7.35 7.32 (m, 1H), 7.31-7.27 (m, 2H), 7.25 7.23 (m, 1H), 4.42 4.30 (m, 1H), 2.75 2.64 (m, 1H), 2.42 (s, 3H), 1.18 0.80 (m, 8H), 0.63 (d, J=13.3 Hz, 1H).

Example 22

Synthesis of Ligand L9

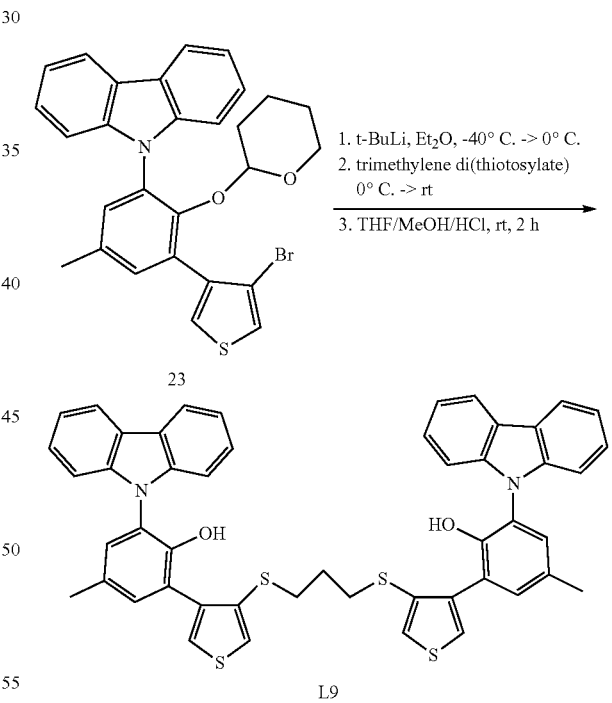

In a nitrogen-filled glove box, compound 23 (0.400 g, 0.77 mmol) was dissolved in $Et_2O$ (5 mL) and cooled to −35° C. The pentane solution of t-BuLi (0.95 mL, 1.62 mmol; 1.70 M) was added to the cold solution of 23 and the reaction mixture was allowed to warm to 0° C. while stirring, then cooled to −35° C. for 30 min. Trimethylene di(thiotosylate) (0.145 g, 0.35 mmol) was added to the solution, which was then allowed to warm to 25° C. and stirred for 14 hours. The reaction mixture was washed with 20 mL saturated $NH_4Cl$ (aq) and extracted into EtOAc (30 mL). Some white solids were present in the biphasic mixture, which were removed by filtration. The organic phase was dried over Na$_2$SO$_4$ and passed through a plug of silica gel. Solvent was removed under vacuum. The crude THP-protected product was subjected to Biotage purification (EtOAc/hexane gradient: 1% to 10% EtOAc over 11.5 CV, then held at 10%).

$^1$H NMR (400 MHz, CDCl$_3$) δ 8.14 (dt, J=7.7, 0.9 Hz, 4H), 7.41-7.36 (m, 4H), 7.35 (d, J=3.3 Hz, 2H), 7.31-7.27 (m, 4H), 7.24-7.23 (m, 2H), 7.21-7.14 (m, 4H), 7.05 (d, J=3.3 Hz, 2H), 5.09 (s, 2H), 2.79 (t, J=7.0 Hz, 4H), 2.34 (s, 6H), 1.80 (p, J=7.0 Hz, 2H).

The purified protected product was dissolved in 16 mL of a 1:1 (v/v) mixture of THF and MEOH, concentration HCl (3 drops from a Pasteur pipette) was added and the solution was stirred at 25° C. for 2 hours. Solvent removal under vacuum gave a white residue, which was dissolved in 15 mL Et$_2$O, passed through a plug of silica gel, and evaporated to dryness under vacuum. The product was dried overnight under high vacuum (0.182 g, 64%).

$^1$H NMR (400 MHz, C$_6$D$_6$) δ 8.05 (dt, J=7.7, 1.0 Hz, 4H), 7.37-7.29 (m, 4H), 7.29-7.19 (m, 8H), 7.05 (dd, J=2.3, 0.6 Hz, 2H), 6.87 (d, J=3.3 Hz, 2H), 6.71 (dd, J=2.2, 0.7 Hz, 2H), 6.61 (d, J=3.3 Hz, 2H), 4.93 (s, 2H), 2.47 (t, J=7.1 Hz, 4H), 1.98 (s, 6H), 1.55 (p, J=7.1 Hz, 2H). $^{13}$C NMR (101 MHz, CDCl$_3$) δ 147.80, 140.97, 138.39, 131.99, 131.66, 130.30, 129.27, 126.09, 125.41, 124.60, 124.23, 124.02, 123.64, 120.35, 120.16, 110.20, 33.56, 28.25, 20.49.

Example 23

Synthesis of Ligand L10

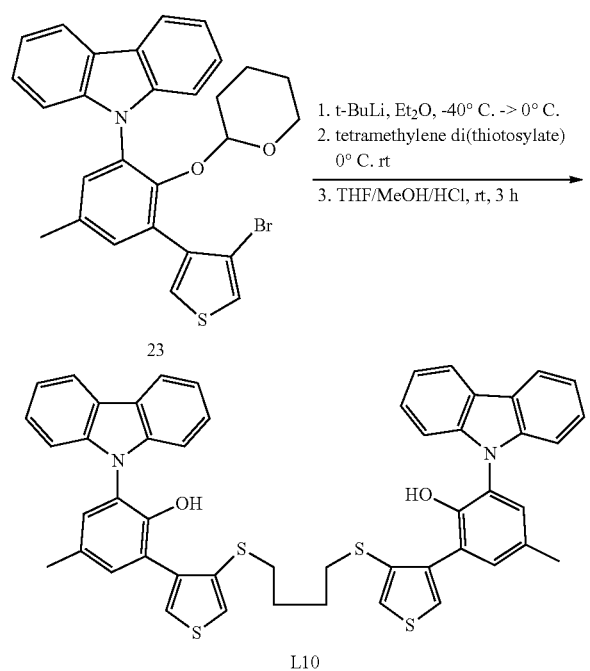

In a nitrogen-filled glove box, compound 23 (0.293 g, 0.57 mmol) was dissolved in Et$_2$O (5 mL) and cooled to −35° C. The pentane solution of t-BuLi (0.70 mL, 1.19 mmol; 1.70 M) was added to the cold solution of 23 and the reaction mixture was allowed to warm to 0° C. while stirring, then cooled to −35° C. for 30 min. Tetramethylene di(thiotosylate) (0.117 g, 0.27 mmol) was added to the solution, which was then allowed to warm to 25° C. and stirred for 14 hours. The reaction mixture was washed with 20 mL saturated NH$_4$Cl (aq) and extracted into EtOAc (30 mL). The organic phase was passed through a plug of silica gel and the solvent was removed under vacuum. The crude THP-protected product was dissolved in 20 mL of a 1:1 (v/v) mixture of THF and MEOH, conc HCl (5 drops from a Pasteur pipette) was added and the solution was stirred at 25° C. for 3 hours. Solvent removal under vacuum gave a white residue, which was dissolved in 100 mL of a 1:1 (v/v) mixture of EtOAc and hexane, passed through a plug of silica gel, and evaporated to dryness under vacuum to afford L10 as a beige solid in quantitative yield.

$^1$H NMR (400 MHz, CDCl$_3$) δ 8.14 (d, J=7.7 Hz, 4H), 7.44-7.37 (m, 4H), 7.35 (d, J=3.3 Hz, 2H), 7.31-7.29 (m, 2H), 7.29-7.26 (m, 4H), 7.22-7.17 (m, 4H), 7.06 (d, J=3.3 Hz, 2H), 5.18 (s, 2H), 2.75-2.64 (m, 4H), 2.35 (s, 6H), 1.69-1.60 (m, 4H). $^{13}$C NMR (101 MHz, CDCl$_3$) δ 147.81, 141.00, 138.21, 131.95, 130.28, 129.29, 126.04, 125.43, 124.30, 124.10, 124.00, 123.61, 120.44, 120.33, 120.11, 110.22, 34.22, 27.84, 20.49.

Example 24

Synthesis of Compound 25

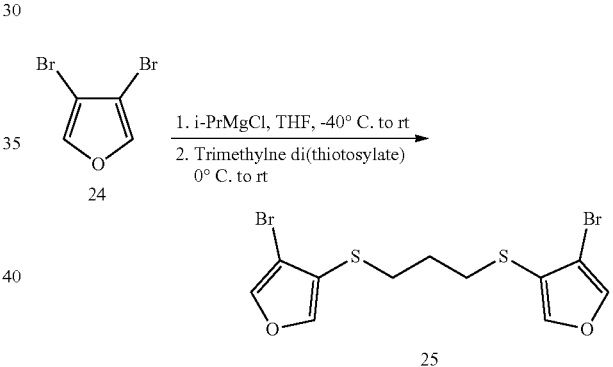

A 50 mL nitrogen-purged round bottom flask was charged with Turbo Grignard solution (1.70 mL, 2.18 mmol; 1.30 M in THF) and cooled to −40° C. in an acetonitrile dry ice bath. To this cold solution was added 3,4-dibromofuran (0.447 g, 1.98 mmol) dissolved in THF (1 mL) dropwise to prevent the reaction from undergoing an exotherm. The reaction mixture was allowed to warm to 25° C. The reaction mixture was then cooled to 0° C. and trimethylene di(thiotosylate) (370 mg, 0.89 mmol) dissolved in THF (2 mL) was added dropwise at 0° C. The reaction mixture was then allowed to warm to ambient temperature overnight. A significant amount of precipitate had formed. Saturated aqueous ammonium chloride solution (15 mL) was added to the reaction mixture and the resultant was extracted into ethyl acetate (20 mL). The organics were washed with saturated aqueous ammonium chloride solution (2×15 mL), dried over sodium sulfate, filtered and absorbed onto Celite under vacuum. This material was purified via flash column chromatography (0 to 20% EtOAc in hexanes) yielding the product as a colorless oil (0.145 g, 41%).

$^1$H NMR (400 MHz, CDCl$_3$) δ 7.48 (dd, J=1.7, 0.4 Hz, 2H), 7.42 (dd, J=1.7, 0.4 Hz, 2H), 2.81 (t, J=7.1 Hz, 4H), 1.78 (p, J=7.1 Hz, 2H). $^{13}$C NMR (101 MHz, CDCl$_3$) δ 145.68, 142.00, 117.46, 106.23, 33.22, 28.44.

Example 25

Synthesis of Ligand L11

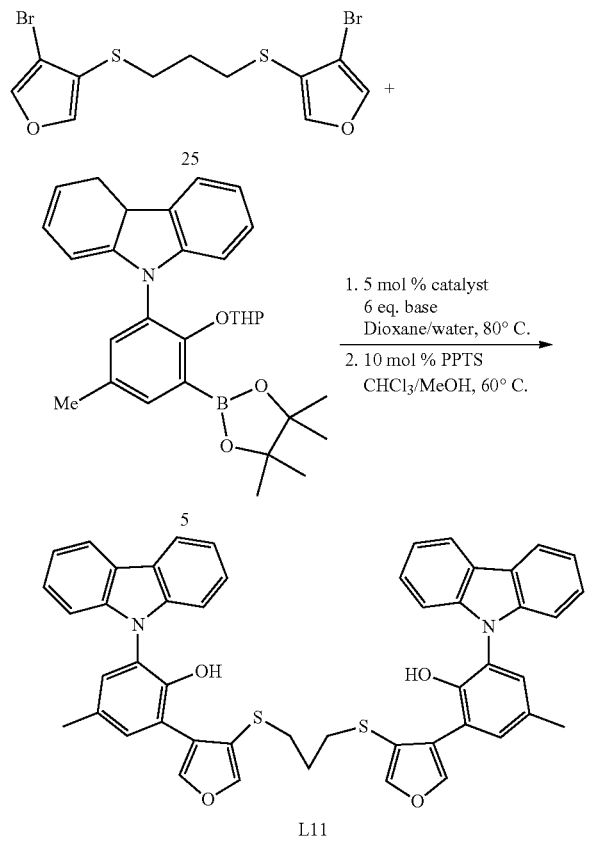

In a nitrogen-filled drybox a vial containing a stirbar was charged with compound 5 (0.237 g, 0.49 mmol), compound 25 (0.065 g, 0.16 mmol) and Cs$_2$CO$_3$ (0.319 g, 0.98 mmol). Deoxygenated dioxane (2 mL) and PdCl (crotyl)(P$^t$Bu$_3$) (0.0033 g, 0.01 mmol) were added and the vial was sealed with a septum cap and removed from the drybox. Deoxygenated, deionized water (0.6 mL) was added via syringe. The reaction mixture was heated to 80° C. and stirred vigorously for 14 hours. The reaction mixture was allowed to cool to 25° C. and the aqueous phase was separated and discarded. The organic phase was evaporated to dryness under vacuum. The residue was deprotected in a mixture of CHCl$_3$ and MEOH (6:1 v/v) using 10 mol % of pyridinium p-toluenesulfonate at 60° C. over 2.5 hours. The solvents were removed under vacuum and the residue was taken up in Et$_2$O (ca 5 mL), passed through a plug of silica gel and evaporated to dryness under vacuum (0.070 g, 56%).

$^1$H NMR (500 MHz, CDCl$_3$) δ 8.14 (dt, J=7.7, 0.9 Hz, 1H), 7.73 (d, J=1.7 Hz, 0H), 7.54 (d, J=1.9 Hz, 1H), 7.46 (d, J=1.7 Hz, 0H), 7.38 (ddd, J=8.2, 7.2, 1.0 Hz, 1H), 7.28 (ddd, J=7.9, 7.4, 0.8 Hz, 1H), 7.21 (dt, J=7.9, 0.8 Hz, 1H), 7.14 (d, J=1.8 Hz, 0H), 5.36 (s, 0H), 5.30 (s, 0H), 2.66 (t, J=7.0 Hz, 1H), 2.35 (s, 1H), 1.76 (p, J=7.0 Hz, 1H). $^{13}$C NMR (126 MHz, CDCl$_3$) δ 147.87, 145.19, 142.85, 140.94, 131.33, 130.48, 128.84, 126.17, 124.05, 123.68, 122.85, 120.39, 120.29, 119.75, 115.85, 110.12, 109.70, 33.57, 28.29, 20.55.

Example 26

Discrete Procatalysts 21-30

In a nitrogen-filled drybox ZrCl$_4$ or HfCl$_4$ (0.05 mmol) was suspended in 2 mL of dry, degassed toluene and MeMgBr (0.140 mL, 0.21 mmol, 4.1 equiv; 1.5 M solution in Et$_2$O) was added to the suspension at 25° C. Within 30 seconds the ligand solution (0.05 mmol) in 2 mL toluene was added and the mixture stirred for 2 hours at 25° C. (Ligands L6-L10 were used in the synthesis of these procatalysts.) The reaction mixture was evaporated to dryness under vacuum and toluene (5 mL) was added. The mixture was filtered (0.45 μm) and the filtrate was evaporated to dryness under vacuum. The toluene addition, filtration and solvent removal under vacuum was repeated one more time to afford the product. Individual yields and NMR data are provided in Table 1.

TABLE 1

Yield and NMR data for Procatalysts 21-30

| Procatalyst | Yield (%) | $^1$H NMR data |
|---|---|---|
| Procatalyst 21 | 76 | $^1$H NMR (400 MHz, C$_6$D$_6$) δ 8.19 (m, 2H), 8.00 (dt, J = 7.8, 0.9 Hz, 2H), 7.41 (d, J = 8.2 Hz, 2H), 7.34 (m, 6H), 7.22 (ddd, J = 8.3, 7.2, 1.2 Hz, 2H), 7.13 (m, 2H), 7.05 (dd, J = 2.3, 0.7 Hz, 2H), 7.00 (dd, J = 2.3, 0.7 Hz, 2H), 6.57 (d, J = 3.7 Hz, 2H), 4.52 (d, J = 3.7 Hz, 2H), 3.55 (dt, J = 10.3, 5.1 Hz, 2H), 2.95 (dt, J = 10.9, 5.7 Hz, 2H), 2.15 (s, 6H), 0.82 (dt, J = 10.5, 5.2 Hz, 2H), −0.84 (s, 6H). |

TABLE 1-continued

Yield and NMR data for Procatalysts 21-30

| Procatalyst | Yield (%) | ¹H NMR data |
|---|---|---|
| 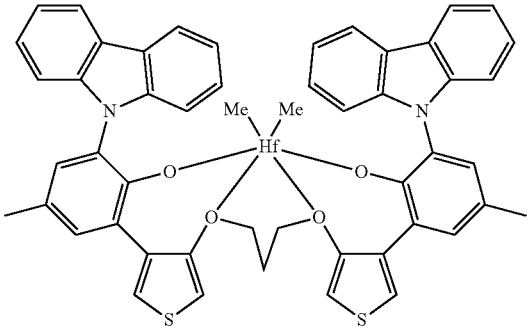
Procatalyst 22 | 76 | ¹H NMR (400 MHz, CDCl$_3$) δ 8.24 (dt, J = 7.6, 1.0 Hz, 2H), 8.09 (dt, J = 7.8, 0.8 Hz, 2H), 7.45-7.42 (m, 2H), 7.42-7.37 (m, 2H), 7.36-7.27 (m, 8H), 7.19-7.14 (m, 2H), 7.13 (d, J = 2.1 Hz, 2H), 7.03 (d, J = 3.7 Hz, 2H), 4.27 (d, J = 3.7 Hz, 2H), 3.98 (dt, J = 10.4, 5.1 Hz, 2H), 3.50 (dt, J = 11.0, 5.8 Hz, 2H), 2.35 (s, 6H), 1.62 (p, J = 5.3 Hz, 2H), −1.76 (s, 6H). |
| 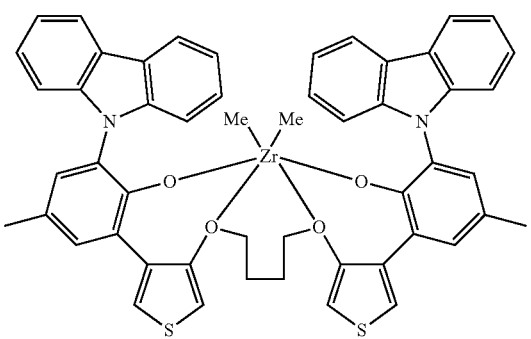
Procatalyst 23 | 80 | ¹H NMR (400 MHz, CDCl$_3$) δ 8.23 (dt, J = 7.6, 0.9 Hz, 2H), 8.07 (dt, J = 7.9, 0.9 Hz, 2H), 7.44-7.40 (m, 4H), 7.37-7.29 (m, 8H), 7.19-7.12 (m, 4H), 7.00 (d, J = 3.7 Hz, 2H), 4.36 (d, J = 3.7 Hz, 2H), 4.14-3.92 (m, 2H), 3.55 (d, J = 11.6 Hz, 2H), 2.37 (s, 6H), 1.43-1.13 (m, 4H), −1.59 (s, 6H). |
| 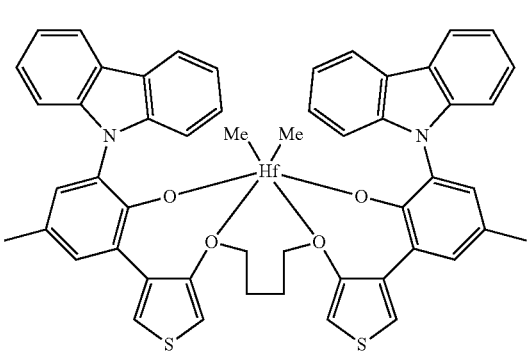
Procatalyst 24 | 40 | ¹H NMR (400 MHz, C$_6$D$_6$) δ 8.18 (m), 7.99 (m), 7.41 (m), 7.31 (m), 7.21 (m), 7.11 (m), 7.03 (m), 6.55 (d, J = 3.7 Hz), 4.68 (d, J = 3.7 Hz), 4.08 (m), 3.46 (m), 2.13 (s), 1.31 (m), −1.13 (s). |
| 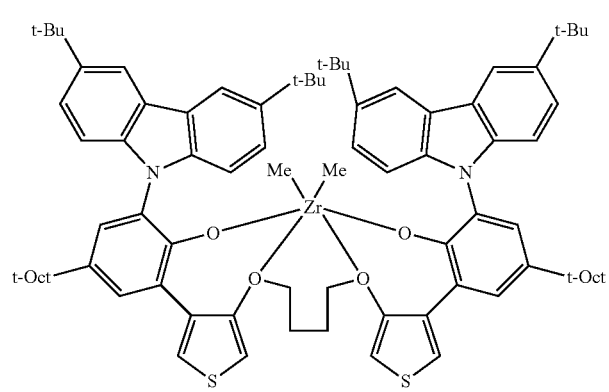
Procatalyst 25 | 87 | ¹H NMR (400 MHz, C$_6$D$_6$) δ 8.59 (t, J = 1.2 Hz, 2H), 8.32 (d, J = 1.4 Hz, 2H), 7.64 (m, 6H), 7.55 (d, J = 8.7 Hz, 2H), 7.39 (m, 4H), 6.57 (d, J = 3.7 Hz, 2H), 4.74 (d, J = 3.7 Hz, 2H), 4.31 (m, 2H), 3.71 (d, J = 8.5 Hz, 2H), 1.65 (d, J = 5.4 Hz, 4H), 1.57 (s, 18H), 1.33 (br s, 6H), 1.27 (br s, 6H), 1.26 (s, 18H), 1.00 (m, 4H), 0.85 (s, 18H), −0.79 (s. 6H). |

TABLE 1-continued

Yield and NMR data for Procatalysts 21-30

| Procatalyst | Yield (%) | $^1$H NMR data |
|---|---|---|
| 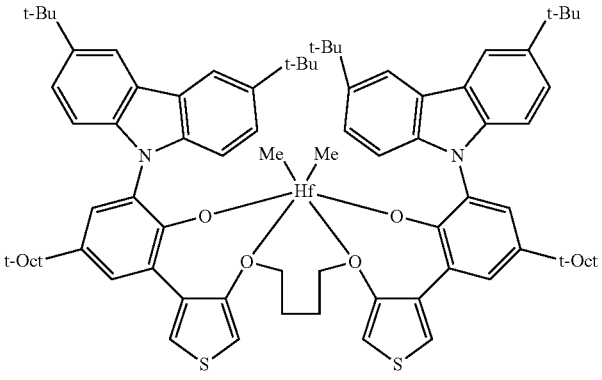<br>Procatalyst 26 | 90 | $^1$H NMR (400 MHz, C$_6$D$_6$) δ 8.60 (m, 2H), 8.32 (d, J = 1.5 Hz, 2H), 7.64 (m, 6H), 7.49 (d, J = 8.7 Hz, 2H), 7.38 (m, 4H), 6.56 (d, J = 3.7 Hz, 2H), 4.76 (d, J = 3.7 Hz, 2H), 4.39 (m, 2H), 3.78 (m, 2H), 1.64 (d, J = 5.3 Hz, 4H), 1.57 (s, 18H), 1.33 (br s, 6H), 1.27 (br s, 6H), 1.26 (s, 18H), 1.01 (m, 4H), 0.85 (s, 18H), −1.03 (s, 6H). |
| 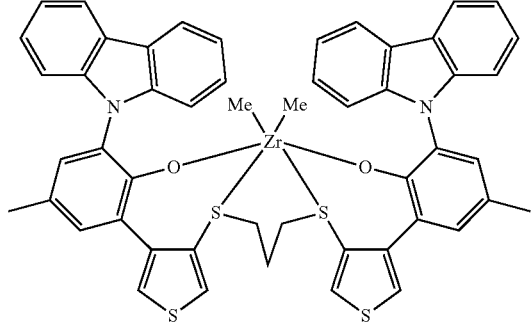<br>Procatalyst 27 | 63 | $^1$H NMR (400 MHz, C$_6$D$_6$) δ 8.17 (d, J = 7.6 Hz, 2H), 7.98 (d, 7 = 7.7 Hz, 2H), 7.55 (d, J = 8.2 Hz, 2H), 7.45 (m, 4H), 7.31 (ddd, J = 7.8, 7.2, 0.9 Hz, 2H), 7.20 (ddd, J = 8.3, 7.3, 1.2 Hz, 2H), 7.12 (t,7 = 7.4 Hz, 2H), 6.96 (dd, J = 2.4, 0.6 Hz, 2H), 6.92 (dd, J = 2.4, 0.6 Hz, 2H), 6.76 (d, J = 3.5 Hz, 2H), 5.77 (d, J = 3.5 Hz, 2H), 2.78 (m, 2H), 2.06 (s, 6H), 1.71 (m, 2H), 0.93 (m, 2H), −0.96 (s, 6H). |
| 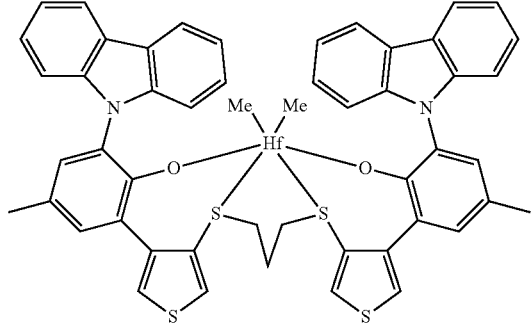<br>Procatalyst 28 | 96 | $^1$H NMR (400 MHz, C$_6$D$_6$) δ 8.18 (d, J = 7.6 Hz, 2H), 7.99 (d, J = 7.6 Hz, 2H), 7.54 (d, J = 8.1 Hz, 2H), 7.45 (ddd, J = 8.1, 7.0, 1.0 Hz, 2H), 7.39 (d, J = 8.1 Hz, 2H), 7.31 (ddd, J = 7.8, 7.1, 0.9 Hz, 2H), 7.20 (m, 2H), 7.12 (m, 2H), 6.97 (d, J = 1.8 Hz, 2H), 6.92 (d, J = 1.8 Hz, 2H), 6.76 (d, J = 3.5 Hz, 2H), 5.79 (d, J = 3.5 Hz, 2H), 2.85 (m, 2H), 2.07 (s, 6H), 1.76 (m, 2H), 0.89 (m, 2H), −1.18 (s, 6H). |

TABLE 1-continued

Yield and NMR data for Procatalysts 21-30

| Procatalyst | Yield (%) | ¹H NMR data |
|---|---|---|
| 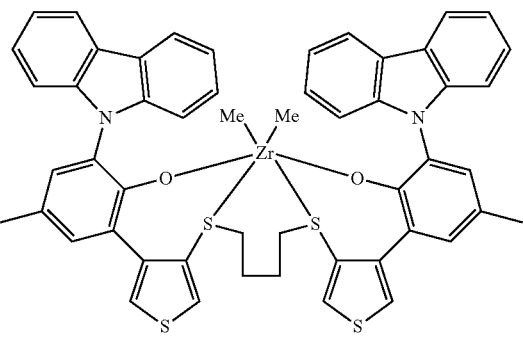<br>Procatalyst 29 | 91 | ¹H NMR (400 MHz, $C_6D_6$) δ 8.17 (d, J = 7.8 Hz, 2H), 8.03 (d, J = 7.2 Hz, 2H), 7.50 (m, 4H), 7.42 (m, 2H), 7.31 (m, 2H), 7.21 (m, 2H), 7.12 (d, J = 7.1 Hz, 2H), 7.00 (dd, J = 2.3, 0.6 Hz, 2H), 6.90 (dd, J = 2.3, 0.6 Hz, 2H), 6.77 (d, J = 3.5 Hz, 2H), 5.89 (d, J = 3.5 Hz, 2H), 2.20 (m, 4H), 2.07 (s, 6H), 0.98 (m, 4H), −0.86 (s, 6H). |
| 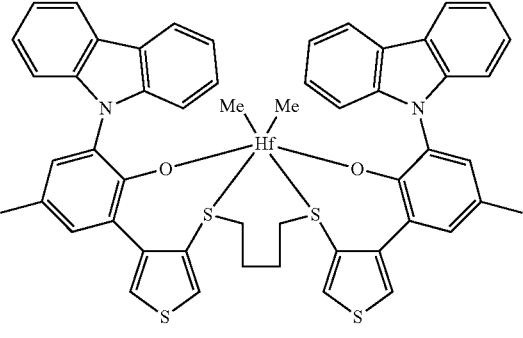<br>Procatalyst 30 | 85 | ¹H NMR (400 MHz, $C_6D_6$) δ 8.17 (d, J = 7.7 Hz), 8.04 (d, J = 7.4 Hz), 7.51 (d, J = 8.0 Hz), 7.43 (d, J = 8.1 Hz), 7.36-7.19 (m), 7.13 (d, J = 7.5 Hz), 7.00 (dd, J = 2.3, 0.6 Hz), 6.90 (dd, J = 2.4, 0.6 Hz), 6.76 (d, J = 3.5 Hz), 5.94 (d, J = 3.5 Hz), 2.31-2.21 (m), 2.07 (s), 1.03-0.92 (m), −1.08 (s). |

Example 27

In Situ Procatalysts 1-20, 31, and 32

In a nitrogen-filled drybox, appropriate volumes of 0.005 M solutions of ligands L1-L5 and L11 (0.1 μmol for procatalysts 1-10, 31, and 32; 0.2 μmol for procatalysts 11-20) were mixed with 0.010 M HfBn$_4$ or ZrBn$_4$ solutions (0.1 μmol) at 25° C., and injected into the PPR at the appropriate time from one-half hour to 3 hours later.

The polymers resulting from Procatalysts 1-20 and 31-32 were prepared according to the PPR screening process, described above, using the following conditions: 120° C., 150 psig, 838 μL 1-octene, 500 nmol MMAO-3A, 100 nmol catalyst, 150 nmol bis(hydrogenated tallow alkyl)methylammonium tetrakis(pentafluorophenyl)borate, 5 mL total liquid volume. All polymerizations were performed with bis(hydrogenated tallow alkyl)methylammonium tetrakis(pentafluorophenyl)borate as the activator and MMAO as the scavenger. The data for the polymers resulting from Procatalysts 1-20 are reported in Table 2. The data for the polymers resulting from Procatalysts 31 and 32 are reported in Table 3.

Catalyst activity (in terms of quench time and polymer yield) and resulting polymer characteristics were assessed for Procatalysts 1-20 and 31-32. The polymerizations were carried out in a parallel polymerization reactor (PPR).

The selected data in Table 2 was obtained at 120° C. polymerization temperature. The activator was [HNMe($C_{18}H_{37}$)$_2$][B($C_6F_5$)$_4$] in an amount of 0.15 μmol. The quench times indicated the time required to reach 50 psi ethylene uptake. The quench times were measured based on the time at which the target uptake occurred or after 1800 seconds the polymerizations were quenched with CO, whichever occurred first.

TABLE 2

Parallel Polymerization Reactor Data

| Procatalyst No | μmol | Quench time (s) | Yield (g) | $M_n$ | $M_w$ (g/mol) | PDI $M_n/M_w$ | Mol % Octene* |
|---|---|---|---|---|---|---|---|
| 1 | 0.10 | 67 | 0.194 | 36,274 | 145,166 | 4.00 | 7.40 |
| 1 | 0.10 | 64 | 0.196 | 6,226 | 30,321 | 4.87 | 9.60 |
| 2 | 0.10 | 1,800 | 0.090 | 14,264 | 232,239 | 16.28 | 8.60 |
| 2 | 0.10 | 1,587 | 0.094 | 15,233 | 283,482 | 18.61 | 7.80 |
| 3 | 0.10 | 202 | 0.114 | 10,152 | 32,416 | 3.19 | 9.90 |
| 3 | 0.10 | 196 | 0.120 | 23,117 | 150,909 | 6.53 | 7.00 |

TABLE 2-continued

Parallel Polymerization Reactor Data

| Procatalyst No | µmol | Quench time (s) | Yield (g) | $M_n$ | $M_w$ (g/mol) | PDI $M_n/M_w$ | Mol % Octene* |
|---|---|---|---|---|---|---|---|
| 4 | 0.10 | 1,801 | 0.025 | 10,173 | 417,028 | 40.99 | 5.70 |
| 4 | 0.10 | 1,801 | 0.023 | 10,200 | 401,730 | 39.39 | 5.40 |
| 5 | 0.10 | 255 | 0.103 | 5,095 | 76,578 | 15.03 | 3.60 |
| 5 | 0.10 | 194 | 0.116 | 7,636 | 71,782 | 9.40 | 3.10 |
| 6 | 0.10 | 1,374 | 0.079 | 11,147 | 207,518 | 18.62 | 3.30 |
| 6 | 0.10 | 687 | 0.085 | 12,922 | 207,910 | 16.09 | 3.20 |
| 7 | 0.10 | 58 | 0.210 | 7,299 | 25,331 | 3.47 | 10.20 |
| 7 | 0.10 | 58 | 0.213 | 6,927 | 26,955 | 3.89 | 9.80 |
| 8 | 0.10 | 303 | 0.121 | 22,305 | 160,128 | 7.18 | 10.40 |
| 8 | 0.10 | 326 | 0.123 | 16,365 | 170,958 | 10.45 | 9.30 |
| 9 | 0.10 | 491 | 0.101 | 3,117 | 72,809 | 23.35 | 5.70 |
| 9 | 0.10 | 321 | 0.122 | 3,234 | 42,374 | 13.10 | 5.60 |
| 10 | 0.10 | 1,801 | 0.090 | 7,587 | 196,577 | 25.91 | 6.30 |
| 10 | 0.10 | 774 | 0.091 | 22,281 | 159,591 | 7.16 | 6.20 |
| 11 | 0.10 | 35 | 0.232 | 10,958 | 29,843 | 2.72 | 10.60 |
| 11 | 0.10 | 33 | 0.249 | 9,913 | 31,283 | 3.16 | 11.30 |
| 12 | 0.10 | 344 | 0.112 | 48,683 | 199,527 | 4.10 | 8.80 |
| 12 | 0.10 | 300 | 0.129 | 41,060 | 204,086 | 4.97 | 8.40 |
| 13 | 0.10 | 78 | 0.168 | 35,394 | 104,751 | 2.96 | 9.20 |
| 13 | 0.10 | 76 | 0.170 | 27,795 | 113,902 | 4.10 | 9.40 |
| 14 | 0.10 | 1,802 | 0.033 | 21,632 | 191,160 | 8.84 | 6.00 |
| 14 | 0.10 | 1,800 | 0.029 | 16,820 | 200,676 | 11.93 | 5.90 |
| 15 | 0.10 | 51 | 0.193 | 7,271 | 30,437 | 4.19 | 4.20 |
| 15 | 0.10 | 47 | 0.207 | 5,108 | 28,982 | 5.67 | 4.40 |
| 16 | 0.10 | 113 | 0.168 | 3,453 | 58,299 | 16.88 | 4.70 |
| 16 | 0.10 | 117 | 0.166 | 4,549 | 66,877 | 14.70 | 4.30 |
| 17 | 0.10 | 33 | 0.269 | 7,253 | 21,264 | 2.93 | 13.30 |
| 17 | 0.10 | 30 | 0.269 | 7,827 | 21,297 | 2.72 | 12.90 |
| 18 | 0.10 | 214 | 0.202 | 49,412 | 169,921 | 3.44 | 9.50 |
| 18 | 0.10 | 191 | 0.204 | 43,118 | 170,332 | 3.95 | 9.30 |
| 19 | 0.10 | 29 | 0.244 | 7,615 | 20,598 | 2.70 | 8.00 |
| 19 | 0.10 | 26 | 0.258 | 9,606 | 21,882 | 2.28 | 6.90 |
| 20 | 0.10 | 158 | 0.122 | 47,236 | 154,682 | 3.27 | 6.30 |
| 20 | 0.10 | 127 | 0.120 | 33,375 | 148,658 | 4.45 | 6.30 |

*Mol % Octene or C8/olefin is defined as: (moles 1-octene/(total moles 1-octene and ethylene)) × 100.

Polymers prepared in polymerization systems including Procatalysts 1-20 yielded polymers with moderate octene incorporation; moderate octene incorporation is between 3 mol % and 15 mol % incorporation. Zirconium-containing Procatalyst 1, 3, 5, 7, 9, 11, 13, 15, 17, and 19 generally had higher efficiencies than that of hafnium-based Procatalyst 2, 4, 6, 8, 10, 12, 14, 16, 18, and 20, as indicated by the shorter quench times and higher polymer yields. Hafnium-based procatalysts generally gave polymer with higher $M_w$ than corresponding zirconium analogues.

The data in Table 3 was obtained at 120° C. or 150° C. polymerization temperature with varying amount of an activator (act) and procatalyst. The activator used to obtain the data in Table 3 was $[HNMe(C_{18}H_{37})_2][B(C_6F_5)_4]$. The quench times indicated the time required to reach the target ethylene uptake (50 psi for 120° C. runs and 75 psi for 150° C. runs) and were measured as described above.

TABLE 3

Parallel Polymerization Reactor Data - Various Amounts of Activators

| Procatalyst No | µmol | Run Temp (° C.) | Act (µmol) | Quench time (s) | Yield (g) | $M_n$ | $M_w$ (g/mol) | PDI $M_n/M_w$ | Mol % Octene* |
|---|---|---|---|---|---|---|---|---|---|
| 31 | 0.03 | 120 | 0.05 | 25 | 0.595 | 2,042 | 6,819 | 3.34 | 29.30 |
| 31 | 0.02 | 120 | 0.03 | 32 | 0.541 | 1,950 | 6,546 | 3.36 | 28.90 |
| 31 | 0.01 | 120 | 0.02 | 26 | 0.599 | 1,986 | 6,902 | 3.48 | 25.60 |
| 31 | 0.01 | 120 | 0.01 | 31 | 0.470 | 2,610 | 6,919 | 2.65 | 27.60 |
| 31 | 0.10 | 120 | 0.15 | 12 | 0.750 | 770 | 1,698 | 2.21 | 27.50 |
| 31 | 0.10 | 120 | 0.15 | 12 | 0.570 | 686 | 1,529 | 2.23 | 34.60 |
| 31 | 0.10 | 120 | 0.15 | 13 | 0.631 | 699 | 1,444 | 2.07 | 30.40 |
| 31 | 0.04 | 150 | 0.05 | 17 | 0.486 | 302 | 603 | 2.00 | 25.80 |
| 31 | 0.03 | 150 | 0.04 | 16 | 0.489 | 674 | 1,549 | 2.30 | 24.50 |
| 31 | 0.02 | 150 | 0.03 | 16 | 0.479 | 696 | 1,381 | 1.98 | 25.50 |
| 31 | 0.01 | 150 | 0.02 | 19 | 0.487 | 658 | 1,206 | 1.83 | 25.10 |
| 31 | 0.15 | 150 | 0.22 | 17 | 0.787 | 763 | 1,702 | 2.23 | 26.00 |
| 31 | 0.15 | 150 | 0.22 | 11 | 0.615 | 686 | 1,467 | 2.14 | 30.20 |
| 31 | 0.15 | 150 | 0.22 | 13 | 0.636 | 666 | 1,414 | 2.12 | 30.70 |
| 31 | 0.15 | 150 | 0.22 | 16 | 0.645 | 672 | 1,438 | 2.14 | 27.00 |
| 32 | 0.03 | 120 | 0.05 | 12 | 0.465 | 661 | 1,369 | 2.07 | 31.10 |
| 32 | 0.02 | 120 | 0.03 | 15 | 0.566 | 704 | 1,343 | 1.91 | 26.10 |
| 32 | 0.01 | 120 | 0.02 | 15 | 0.450 | 688 | 1,679 | 2.44 | 28.90 |
| 32 | 0.01 | 120 | 0.01 | 14 | 0.457 | 694 | 1,621 | 2.34 | 27.50 |
| 32 | 0.10 | 120 | 0.15 | 14 | 0.669 | 2,782 | 8,397 | 3.02 | 37.30 |
| 32 | 0.10 | 120 | 0.15 | 13 | 0.638 | 2,879 | 7,861 | 2.73 | 36.40 |
| 32 | 0.10 | 120 | 0.15 | 13 | 0.718 | 3,021 | 9,131 | 3.02 | 30.50 |
| 32 | 0.10 | 120 | 0.15 | 15 | 0.656 | 2,562 | 7,915 | 3.09 | 31.90 |
| 32 | 0.04 | 150 | 0.05 | 22 | 0.607 | 2,005 | 5,615 | 2.80 | 28.20 |
| 32 | 0.03 | 150 | 0.04 | 23 | 0.539 | 2,234 | 6,183 | 2.77 | 23.60 |
| 32 | 0.02 | 150 | 0.03 | 25 | 0.571 | 4,086 | 12,531 | 3.07 | 27.80 |
| 32 | 0.01 | 150 | 0.02 | 28 | 0.526 | 7,920 | 25,144 | 3.17 | 23.80 |
| 32 | 0.15 | 150 | 0.22 | 19 | 0.766 | 1,933 | 6,092 | 3.15 | 31.30 |
| 32 | 0.15 | 150 | 0.22 | 15 | 0.721 | 2,060 | 6,254 | 3.04 | 30.00 |
| 32 | 0.15 | 150 | 0.22 | 14 | 0.739 | 2,042 | 6,760 | 3.31 | 28.00 |
| 32 | 0.15 | 150 | 0.22 | 18 | 0.673 | 1,805 | 5,848 | 3.24 | 30.40 |

*Mol % Octene or C8/olefin is defined as: (moles 1-octene/(total moles 1-octene and ethylene)) × 100.

Polymers prepared in polymerization systems including Procatalysts 31 and 32 exhibited very high efficiencies, as indicated by the shorter quench times and higher polymer yields. These procatalysts also produced polymers with low $M_w$ and high octene incorporation; high octene incorporation is at least 15 mol % incorporation.

The data in Table 4 was obtained from the batch-reactor polymerizations at a 120° C. polymerization temperature with 1.2 eq. of [HNMe($C_{18}H_{37}$)$_2$][B($C_6F_5$)$_4$] as the activator. The run time was 10 minutes, and the scavenger was MMAO-3A.

TABLE 4

Batch Reactor Ethylene and 1-Octene Copolymerization Data

| Procatalyst | Efficiency (g poly/g metal) | $M_w$ (g/mol) | PDI | 1-Octene mol % |
|---|---|---|---|---|
| Procatalyst 21 | 6,577,500 | 29,500 | 1.9 | 18.2 |
| Procatalyst 22 | 2,393,800 | 236,300 | 2.6 | 23.1 |
| Procatalyst 23 | 6,961,200 | 31,000 | 2.1 | 17.5 |
| Procatalyst 24 | 448,200 | 289,700 | 2.3 | 19.9 |
| Procatalyst 25 | 2,718,700 | 25,100 | 1.9 | 15.9 |
| Procatalyst 26 | 986,000 | 214,900 | 2.0 | 22.1 |
| Procatalyst 27 | 7,673,800 | 1,500 | 3.5 | 13.0 |
| Procatalyst 28 | 1,618,500 | 3,400 | 1.9 | 21.4 |
| Procatalyst 29 | 3,672,400 | 5,500 | 2.3 | 16.3 |
| Procatalyst 30 | 896,400 | 36,300 | 3.3 | 17.9 | solvent: 1153 g of Isopar E, monomer: 280 psi of ethylene, comonomer: 568 g of 1-octene.

Polymers prepared in the batch reactor as a result of Procatalysts 21 to 23 and 25 to 30 exhibited high efficiencies, all greater than 800,000 grams polymer per gram metal. Procatalysts 21 to 26 and 28 to 30 produced polymers having high mol % of octene incorporation (greater than 15 mol % incorporation). Procatalyst 27 produced polymer having moderate mol % of octene incorporation (greater than 10 mol % incorporation). The polymers produced from zirconium-based Procatalysts 21, 23, 25, and 27 to 29 exhibited higher efficiencies, but lower $M_w$ compared to polymers produced from corresponding hafnium-based Procatalysts 22, 24, 26, 28, and 30, respectively. Procatalysts 22, 24, and 26 yielded polymers with comparatively high molecular weights (all greater than 200,000 g/mol) and high octene incorporation of greater than 15 mol %, but had a lesser efficiency compared to the efficiencies of Procatalysts 21, 23, 25, and 27-30. Thioether-bridged Procatalysts 27 and 29 gave polymers with significantly lower $M_w$ compared to analogous ether-bridged Procatalysts 21 and 23. Similarly, thioether-bridged Procatalysts 28 and 30 gave polymers with significantly lower $M_w$ compared to analogous ether-bridged Procatalysts 22 and 24.

MEASUREMENT STANDARDS

Density

Samples that were measured for density were prepared according to ASTM D-1928, which is incorporated herein by reference in its entirety. Measurements were made within one hour of sample pressing using ASTM D-792, Method B, which is incorporated herein by reference in its entirety.

Octene Content

The mole % (mol %) of 1-octene within each sample was determined by taking a ratio of the $CH_3$ area (1382.7-1373.5 wavenumbers) to the $CH_2$ area (1525-1400 wavenumbers) and normalizing to a standard curve generated through NMR analysis of poly(ethylene-co-1-octene) standards.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors could include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors was sometimes referred to as "3D-GPC", while the term "GPC" alone generally refered to conventional GPC. Depending on the sample, either the 15-degree angle or the 90-degree angle of the light scattering detector was used for calculation purposes.

Data collection was performed using Viscotek TriSEC software, Version 3, and a 4-channel Viscotek Data Manager DM400. The system was equipped with an on-line solvent degassing device from Polymer Laboratories (Shropshire, UK). Suitable high temperature GPC columns could be used such as four 30 cm long Shodex HT803 13 micron columns or four 30 cm Polymer Labs columns of 20-micron mixed-pore-size packing (MixA LS, Polymer Labs). The sample carousel compartment was operated at 140° C. and the column compartment was operated at 150° C. The samples were prepared at a concentration of 0.1 grams of polymer in 50 milliliters of solvent. The chromatographic solvent and the sample preparation solvent contain 200 ppm of butylated hydroxytoluene (BHT). Both solvents were sparged with nitrogen. The polyethylene samples were gently stirred at 160° C. for four hours (4 h). The injection volume was 200 microliters (IL). The flow rate through the GPC was set at 1 mL/minute.

The GPC column set was calibrated before running the Examples by running twenty-one narrow molecular weight distribution polystyrene standards. The molecular weight (Mw) of the standards ranges from 580 to 8,400,000 grams per mole (g/mol), and the standards were contained in 6 "cocktail" mixtures. Each standard mixture had at least a decade of separation between individual molecular weights. The standard mixtures were purchased from Polymer Laboratories (Shropshire, UK). The polystyrene standards were prepared at 0.025 g in 50 mL of solvent for molecular weights equal to or greater than 1,000,000 g/mol and 0.05 g in 50 mL of solvent for molecular weights less than 1,000,000 g/mol. The polystyrene standards were dissolved at 80° C. with gentle agitation for 30 minutes. The narrow standards mixtures were run first and in order of decreasing highest molecular weight (Mw) component to minimize degradation. The polystyrene standard peak molecular weights were converted to polyethylene Mw using the Mark-Houwink constants. Upon obtaining the constants, the two values were used to construct two linear reference conventional calibrations for polyethylene molecular weight and polyethylene intrinsic viscosity as a function of elution column.

Measurement for Efficiency

The catalytic efficiency was measured in terms of amount of polymer produced relative to the amount catalyst used in solution polymerization process, wherein the polymerization temperature was at least 130° C.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A catalyst system comprising a metal-ligand complex according to formula (I):

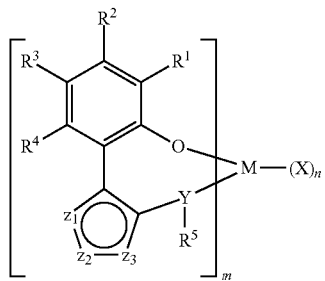

where
M is a metal selected from the group consisting of titanium, zirconium, hafnium, the metal having a formal oxidation state of +2, +3, or +4;
each X is a monodentate or bidentate ligand independently selected from the group consisting of unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —N(R$^N$)$_2$, and —NCOR$^C$;
n is 1, 2 or 3;
m is 1 or 2;
the metal-ligand complex has 6 or fewer metal-ligand bonds;
each Y is independently selected from oxygen or sulfur;
each R$^1$, R$^2$, R$^3$, and R$^4$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C═N—, R$^C$C(O)O—, R$^C$OC(O)—, R$^C$C(O)N(R)—, (R$^C$)$_2$NC(O)—, halogen, and —H;
each R$^5$ is independently chosen from $(C_1-C_{50})$hydrocarbyl, $(C_1-C_{50})$heterohydrocarbyl, $(C_6-C_{50})$aryl, $(C_4-C_{50})$heteroaryl, —Si(R$^C$)$_3$, and —Ge(R$^C$)$_3$, and, when m is 2, two R$^5$ are optionally covalently linked;
for each individual ring containing groups $z_1$, $z_2$, and $z_3$, each of $z_1$, $z_2$, and $z_3$ is independently selected from the group consisting of sulfur, oxygen, —N(R$^R$)—, or —C(R$^R$)—, provided that at least one and not more than two of $z_1$, $z_2$, and $z_3$ are —C(R$^R$)—, where R$^R$ is —H or $(C_1-C_{30})$hydrocarbyl, wherein any two R$^R$ groups bonded to neighboring atoms are optionally linked;
each R$^C$, R$^N$, and R$^P$ in formula (I) is independently a $(C_1-C_{30})$hydrocarbyl.

2. The catalyst system according to claim 1, wherein:
M is zirconium or hafnium;
each X is independently selected from the group consisting of $(C_6-C_{20})$aryl, $(C_4-C_{20})$heteroaryl, $(C_4-C_{12})$diene, and a halogen;

each Y is oxygen;
each R$^1$ is independently selected from the group consisting of $(C_1-C_{50})$aryl and $(C_4-C_{50})$heteroaryl; and
each R$^2$, R$^3$ and R$^4$ is independently selected from the group consisting of $(C_1-C_{50})$hydrocarbyl, $(C_1-C_{40})$heterohydrocarbyl, $(C_6-C_{40})$aryl, $(C_4-C_{50})$heteroaryl, halogen, and —H.

3. The catalyst system according to claim 1, wherein for each individual ring containing groups $z_1$, $z_2$, and $z_3$, one of $z_1$, $z_2$, and $z_3$ is a sulfur atom, and two of $z_1$, $z_2$, and $z_3$ are —C(H)—.

4. The catalyst system according to claim 1, wherein each R$^1$ is carbazolyl, each R$^2$ is methyl, and each R$^3$ is methyl.

5. The catalyst system according to claim 1, wherein each R$^1$ is 3,6-di-tert-butylcarbazol-9-yl.

6. The catalyst system according to claim 1, wherein each R$^1$ is 3,5-di-tert-butylphenyl.

7. The catalyst system according to claim 1, wherein R$^2$ is tert-octyl.

8. The catalyst system according to claim 1, wherein m is 2 and the metal-ligand complex has a structure according to formula (II):

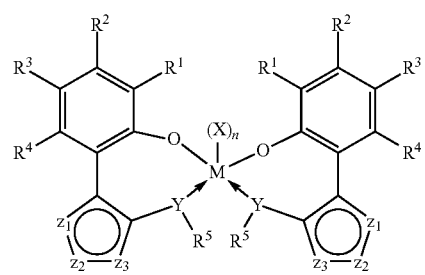

where R$^1$, R$^2$, R$^3$, R$^4$, R$^5$, $z_1$, $z_2$, $z_3$, Y, and X are as defined in formula (I); and n is 1 or 2.

9. The catalyst system according to claim 8, wherein:
M is zirconium or hafnium;
each X is independently selected from the group consisting of $(C_6-C_{50})$aryl, $(C_6-C_{50})$heteroaryl, $(C_4-C_{12})$diene, and halogen;
each Y is oxygen;
each R$^1$, R$^2$, R$^3$ and R$^4$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, halogen, and hydrogen.

10. The catalyst system according to claim 8, wherein for each individual ring containing groups $z_1$, $z_2$, and $z_3$, one of $z_1$, $z_2$, and $z_3$ is a sulfur atom, and two of $z_1$, $z_2$, and $z_3$ are —C(H)—.

11. The catalyst system according to claim 9, wherein n is 2 and each X is benzyl.

12. The catalyst system according to claim 8, wherein each R$^1$ is carbazolyl, each R$^2$ is methyl, and each R$^3$ is methyl.

13. The catalyst system according to claim 8, wherein each R$^1$ is 3,6-di-tert-butylcarbazol-9-yl or 2,7-di-tert-butylcarbazol-9-yl.

14. The catalyst system according to claim 8, wherein each R$^3$ is tert-octyl.

15. The catalyst system according to claim 8, wherein each R$^1$ is 3,5-di-tert-butylphenyl.

16. The catalyst system according to claim 8, wherein the two groups R$^5$ are covalently linked, whereby the metal-ligand complex comprises a divalent radical Q consisting of the two covalently linked groups $R^5$, and the metal-ligand complex has a structure according to formula (III):

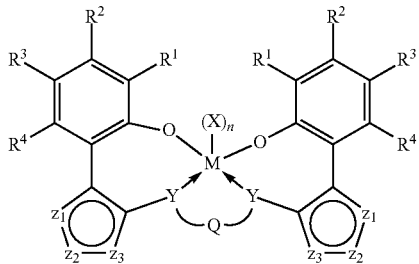

(III)

where:

Q is $(C_1-C_{12})$alkylene, $(C_1-C_{12})$heteroalkylene, $(-CH_2Si(R^C)_2CH_2-)$, $(-CH_2CH_2Si(R^C)_2CH_2CH_2-)$, $(-CH_2Ge(R^C)_2CH_2-)$, or $(-CH_2CH_2Ge(R^C)_2CH_2CH_2-)$, where $R^C$ is $(C_1-C_{30})$hydrocarbyl;

$R^{1-4}$, Y, X, M, $z_1$, $z_2$, and $z_3$ are defined in formula (I); and n is 1, or 2.

17. The catalyst system according to claim 16, wherein Q is $-CH_2Si(CH_3)_2CH_2-$.

18. A polymerization process for producing an ethylene-based polymer, the polymerization process comprising:
polymerizing ethylene and at least one additional α-olefin in the presence of a catalyst system according to claim 1 and at least one activator to form a polymer,
wherein the polymer exhibits:
a density from 0.860 g/cm³ to 0.973 g/cm³, measured according to ASTM D792;
a molecular weight distribution from 1 to 20; and
less than 20% octene incorporation.

19. The polymerization process according claim 17, wherein the density is from 0.880 g/cm³ to 0.920 g/cm³.

20. The polymerization process according claim 17, wherein the activator comprises MMAO, bis(hydrogenated tallow alkyl)methylammonium, tetrakis(pentafluorophenyl) borate, or tris(pentafluorophenyl)borane.

* * * * *